US012552761B2

(12) United States Patent
Sanders et al.

(10) Patent No.: US 12,552,761 B2
(45) Date of Patent: Feb. 17, 2026

(54) PHOTOINITIATORS, PHOTOHARDENABLE COMPOSITIONS, AND METHODS FOR FORMING AN OBJECT IN A VOLUME

(71) Applicant: QUADRATIC 3D, INC., Charlestown, MA (US)

(72) Inventors: Samuel N. Sanders, Arlington, MA (US); Emily M. Arndt, Akron, OH (US)

(73) Assignee: QUADRATIC 3D, INC., Charlestown, MA (US)

( * ) Notice: Subject to any disclaimer, the term of this patent is extended or adjusted under 35 U.S.C. 154(b) by 0 days.

(21) Appl. No.: 18/590,434

(22) Filed: Feb. 28, 2024

(65) Prior Publication Data
US 2024/0217943 A1 Jul. 4, 2024

Related U.S. Application Data

(63) Continuation of application No. PCT/US2022/042183, filed on Aug. 31, 2022.

(60) Provisional application No. 63/239,355, filed on Aug. 31, 2021.

(51) Int. Cl.
*C07D 311/92* (2006.01)
*B29C 64/135* (2017.01)
*B29C 64/268* (2017.01)
*B33Y 10/00* (2015.01)
*B33Y 70/00* (2020.01)
*C09D 4/00* (2006.01)
*B29C 64/245* (2017.01)
*B29K 33/00* (2006.01)
*B29K 105/00* (2006.01)

(52) U.S. Cl.
CPC .......... *C07D 311/92* (2013.01); *B29C 64/135* (2017.08); *B29C 64/268* (2017.08); *B33Y 10/00* (2014.12); *B33Y 70/00* (2014.12); *C09D 4/00* (2013.01); *B29C 64/245* (2017.08); *B29K 2033/26* (2013.01); *B29K 2105/0005* (2013.01)

(58) Field of Classification Search
CPC .................................................. C07D 311/92
See application file for complete search history.

(56) References Cited

U.S. PATENT DOCUMENTS

| 3,567,605 | A | 3/1971 | Becker |
| 3,627,690 | A | 12/1971 | Casella et al. |
| 3,933,509 | A | 1/1976 | Noguchi et al. |
| 4,041,476 | A | 8/1977 | Swainson |
| 4,078,229 | A | 3/1978 | Swainson et al. |
| 4,238,840 | A | 12/1980 | Swainson |
| 4,288,861 | A | 9/1981 | Swainson et al. |
| 4,333,165 | A | 6/1982 | Swainson et al. |
| 4,466,080 | A | 8/1984 | Swainson et al. |
| 4,471,470 | A | 9/1984 | Swainson et al. |
| 4,826,977 | A | 5/1989 | Heller et al. |
| 4,931,221 | A | 6/1990 | Heller |
| 4,980,089 | A | 12/1990 | Heller |
| 5,066,818 | A | 11/1991 | Gemert et al. |
| 5,230,986 | A | 7/1993 | Neckers |
| 5,369,158 | A | 11/1994 | Knowles et al. |
| 5,446,151 | A * | 8/1995 | Rickwood ................. C09K 9/02 252/586 |
| 5,645,767 | A * | 7/1997 | Van Gemert ........ C08K 5/1545 546/281.1 |
| 5,651,923 | A * | 7/1997 | Kumar .................. C07D 307/77 546/281.1 |
| 5,723,072 | A | 3/1998 | Kumar et al. |
| 6,190,580 | B1 | 2/2001 | Melzig et al. |
| 6,337,409 | B1 | 1/2002 | Hughes et al. |
| 6,340,766 | B1 | 1/2002 | Lin |
| 6,353,102 | B1 | 3/2002 | Kumar |
| 6,367,930 | B1 | 4/2002 | Santelices et al. |
| 6,478,989 | B1 | 11/2002 | Lin |
| 6,548,593 | B2 | 4/2003 | Merz et al. |
| 7,244,548 | B2 | 7/2007 | Barachevsky et al. |
| 7,262,295 | B2 * | 8/2007 | Walters ................ C07D 405/04 549/330 |
| 7,778,723 | B2 | 8/2010 | Cregger |
| 8,545,984 | B2 | 10/2013 | He et al. |
| 9,376,602 | B2 | 6/2016 | Walther et al. |
| 2004/0185255 | A1 * | 9/2004 | Walters ................ C07D 491/04 442/131 |
| 2007/0138448 | A1 * | 6/2007 | Chopra .................... G03C 1/73 252/582 |

(Continued)

FOREIGN PATENT DOCUMENTS

CA 2914571 A1 * 6/2010 ............ G03C 1/685
CN 1328108 A * 12/2001
(Continued)

OTHER PUBLICATIONS

Gabbutt et al, Synthesis and photochromic properties of symmetrical aryl ether linked bi- and tri-naphthopyrans, 2008, Dyes and Pigments, 76, 24-34 (Year: 2008).*

Kim et al, The photophysical behavior of the photochromic naphthopyran derivative having photo-switching ability, 2015, Spectrochimica Acta Part A: Molecular and Biomolecular Spectroscopy, 136, 1291-1297 (Year: 2015).*

Sandmeier et al, Solvent-Free Three-Dimensional Printing of Biodegradable Elastomers Using Liquid Macrophotoinitiators, Macromolecules, 2021, 54, 7830-7839 (Year: 2021).*

(Continued)

*Primary Examiner* — Timothy Kennedy

(57) ABSTRACT

Photoswitchable photoinitiators comprising a naphthopyran molecule including one or more substituents wherein at least one substituent comprises a substituted or unsubstituted diaryl ketone moiety are disclosed. Photohardenable compositions and methods for forming an object in a volume and products thereof, which photohardenable compositions and methods include such photoswitchable photoinitiator, are also disclosed.

23 Claims, No Drawings

(56) References Cited

U.S. PATENT DOCUMENTS

| | | | |
|---|---|---|---|
| 2007/0145337 A1* | 6/2007 | Chopra | G03C 1/73 252/586 |
| 2007/0211110 A1 | 9/2007 | Ifitime et al. | |
| 2009/0202919 A1 | 8/2009 | Waldman et al. | |
| 2011/0042629 A1* | 2/2011 | Chopra | G03C 1/73 252/586 |
| 2015/0031785 A1* | 1/2015 | Amino | C08G 18/7621 524/84 |
| 2018/0022860 A1* | 1/2018 | Ito | G02B 1/04 528/18 |
| 2018/0333913 A1 | 11/2018 | Lin et al. | |
| 2020/0063093 A1 | 2/2020 | Matheu et al. | |
| 2020/0108557 A1 | 4/2020 | Lippert et al. | |
| 2020/0201079 A1* | 6/2020 | Liang | B29D 11/00009 |
| 2020/0361152 A1 | 11/2020 | Shusteff et al. | |
| 2021/0115167 A1 | 4/2021 | Scott et al. | |
| 2022/0055290 A1 | 2/2022 | Hahn et al. | |
| 2022/0305723 A1 | 9/2022 | Garmshausen et al. | |
| 2022/0410473 A1 | 12/2022 | Garmshausen et al. | |
| 2023/0012690 A1 | 1/2023 | Arndt | |
| 2023/0037488 A1 | 2/2023 | Hirata et al. | |
| 2023/0094821 A1 | 3/2023 | Twietmeyer et al. | |
| 2024/0166912 A1 | 5/2024 | Sanders et al. | |
| 2024/0208111 A1 | 6/2024 | Twietmeyer | |

FOREIGN PATENT DOCUMENTS

| | | | |
|---|---|---|---|
| WO | WO 98/55457 | 12/1998 | |
| WO | WO-0119813 A1 * | 3/2001 | C07D 311/94 |
| WO | WO 01/70719 A2 | 9/2001 | |
| WO | WO 2016/048361 A1 | 3/2016 | |
| WO | WO 2020/139858 A1 | 7/2020 | |
| WO | WO-2021154897 A1 * | 8/2021 | C08F 222/1065 |

OTHER PUBLICATIONS

International Search Report for PCT/US2022/042183, Nov. 29, 2022 (Year: 2022).*
Written Opinion for PCT/US2022/042183, Nov. 29, 2022 (Year: 2022).*
Machine translation of CN 1328108, retrieved from EPO database Jul. 8, 2025 (Year: 2025).*
Bao, Y., "Recent Trends in Advanced Photoinitiators for Vat Photopolymerization 3D Printing", Macromol. Rapid Commun. 2022, 43, 2200202.
Gabbutt. C.D., et al., The synthesis and properties of naphthopyran-boradiazaindacene conjugates, Dyes and Pigments 94 (2012) 175-182.
Graca, V., et al., "Easy synthesis of polycyclic naphthopyran UV photoswitches using two one pot reactions", Dyes and Pigments 192 (2021) 109388. Lee, S-K., et al., "Benzospiropyrans as Photochromic and/or Thermochromic Photoinitiators", Chem. Mater. 1991, 3, pp. 852-858.
Lee, S-K., et al., "Benzospiropyrans as Photochromic and/or Thermochronic Photoinitiators", Chem. Mater. 1991, 3, pp. 852-858.
Lee, S-K., et al., "Two-photon radical photoinitiator system based on iodinated benzospiropyrans", Chem. Mater. 1991, 3, pp. 858-864.
Lee, Y-H, et al., "Fabrication of Periodic 3D Nanostructuration for Optical Surfaces by Holographic Two-Photon-Polymerization", Int'l Journal of Information and Electronics Engineering, vol. 6, No. 3, May 2016.
Liu, S., et al., "Monocomponent Photoinitiators based on Benzophenone-Carbazole Structures for LED Photoinitiating Systems and Application on 3D printing": Polymers, 2020, 12, 1394.
Liravi, F., et al., "Additive manufacturing of 3D structures with non-Newtonian highly viscous fluids: Finite element modeling and experimental validation", Additive Manufacturing (2016), http://dx.doi.org/10.1016/j.addma.2016.10.008.
Lu, P., et al., "wavelength-selective light-matter interactions in polymer science", Matter, 4, 2172-2229, Jul. 7, 2021.
Perez-Prieto, J., et al., "Diaryl Ketones as Photoactivators". Mini-Review in Organic Chemistry, 2006, 3, 117-135.
Reghely, M., et al., "Xolography for linear volumetric 3D printing ", Nature vol. 588 24/Dec. 31, 2020.
Reghely, M., et al., Supplementary Information - "Xolography for linear volumetric 3D printing ", Nature Research 2020.
Texas Instruments "DLP6500 0.65 1018p MVSP Type A DMD", DLP6500, DLPS040A-Oct. 2014—Revised Oct. 2016.
Texas Instruments "Ti Dlr Technology for 3D Printing—Design scalable high-speed stereolithograpy [sic] systems using Ti Dlp technology" 2016.
Texas Instruments Application Report DLPA022-Jul. 2010 entitled "DLPTM System Optics".
Tomasulo, M., et al., "Synthesis and Properties of Benzophenone-Spiropyran and Naphthalene-Spiropyran Conjugates", J. Org. Chem. 2007, 72, 595-605.
Towns, A., "Naphthopyran Dyes", Physical Sciences Reviews 2020: 20190085 De Gruyter.
Towns, Andrew D., Chapter 5 entitled "Industrial Photochromism" (pp. 227-279), from book Applied Photochemistry, Lecture Notes in Chemistry 92, DOI 10.1007/978-3-319-31671-0_5, Giacomo Bergamini, Serena Silvi (eds.), Publisher: Springer International Publishing Switzerland (2016).
Wang, B., et al., Nature Communications (2022) 13:367 (https://doi.org/10.1038/s41467-022-28013-4).
Yan, T., et al., "Development of photochromic fused 2H-naphthopyrans with promising thermal facing rates". J. Mater. Chem. C, 2022'DOI: 10.1039/d1tc06105d.
NonFinal Office Action dated Nov. 14, 2025 in U.S. Appl. No. 18/414,277 of Quadratic 3D, Inc., filed Jan. 16, 2024.

* cited by examiner

PHOTOINITIATORS, PHOTOHARDENABLE COMPOSITIONS, AND METHODS FOR FORMING AN OBJECT IN A VOLUME

CROSS-REFERENCE TO RELATED APPLICATIONS

This application is a continuation of International Application No. PCT/US2022/042183, filed 31 Aug. 2022, which International Application claims priority to U.S. Provisional Patent Application No. 63/239,355 filed on 31 Aug. 2021, each of which applications is hereby incorporated herein by reference in its entirety for all purposes.

TECHNICAL FIELD OF THE INVENTION

The present relates to the technical field of volumetric printing and related materials, methods, and products thereof.

BRIEF SUMMARY OF THE INVENTION

The present invention includes photoswitchable photoinitiators comprising a naphthopyran molecule including one or more substituents at least one of which comprises a substituted or unsubstituted diaryl ketone moiety. The present invention also includes photohardenable compositions and methods for forming an object in a volume, which photohardenable compositions and methods include a photoswitchable photoinitiator comprising a naphthopyran molecule including one or more substituents at least one of which comprises a substituted or unsubstituted diaryl ketone moiety.

In accordance with one aspect of the present invention there is provided a photoswitchable photoinitiator comprising a naphthopyran molecule including one or more substituents wherein at least one substituent comprises a substituted or unsubstituted diaryl ketone moiety represented by general formula (A):

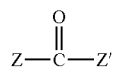

(A)

wherein Z and Z' are the same or different and are independently a substituted or unsubstituted aryl group or a substituted or unsubstituted heteroaryl group.

Examples of a preferred substituted or unsubstituted aryl group for inclusion in general formula (A) as Z and/or Z' include a substituted or unsubstituted phenyl or naphthyl group.

In accordance with another aspect of the present invention there is provided a photoswitchable photoinitiator comprising a naphthopyran molecule represented by general formula (I):

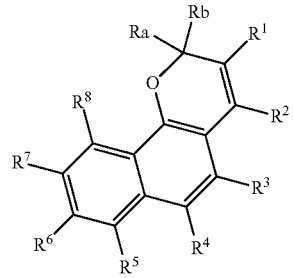

(I)

wherein Ra, Rb, and $R^1$-$R^8$ are the same or different and represent hydrogen, deuterium, a substituted or unsubstituted alkyl group, a substituted or unsubstituted alkenyl group, a substituted or unsubstituted cycloalkenyl group, a substituted or unsubstituted cycloalkyl group, a substituted or unsubstituted aryl group, a substituted or unsubstituted aralkyl group, a substituted or unsubstituted alkylaryl group, a substituted or unsubstituted heteroaryl group, a substituted or unsubstituted aryloxy group, a substituted or unsubstituted alkoxy group, a substituted or unsubstituted ester group, a substituted or unsubstituted carbonate group, a substituted or unsubstituted ketone group, a substituted or unsubstituted aldehyde group, a substituted or unsubstituted imine group, a substituted or unsubstituted carboxyl group, a substituted or unsubstituted amido group, a substituted or unsubstituted urethane group, a substituted or unsubstituted urea group, a substituted or unsubstituted tetrazine group, a substituted or unsubstituted amino group, iodo, bromo, chloro, fluoro, a cyano group, a nitro group, a hydroxyl group, a thiol, an alkyl thioether, an aryl thioether, or a substituted or unsubstituted alcohol group; wherein at least one of Ra, Rb, and $R^1$-$R^8$ comprises a substituted or unsubstituted diaryl ketone moiety represented by general formula (A):

(A)

wherein Z and Z' are the same or different and are independently a substituted or unsubstituted aryl group or a substituted or unsubstituted heteroaryl group.

Examples of a preferred substituted or unsubstituted aryl group for inclusion in general formula (A) as Z and/or Z' include a substituted or unsubstituted phenyl or naphthyl group.

In accordance with another aspect of the present invention there is provided a photoswitchable photoinitiator comprising a naphthopyran molecule represented by general formula (II):

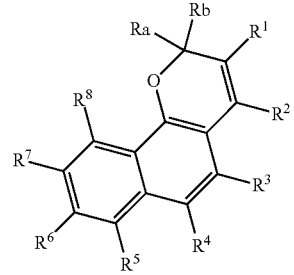

(I)

wherein Ra, Rb, and R¹-R⁸ are the same or different and represent hydrogen, deuterium, a substituted or unsubstituted alkyl group, a substituted or unsubstituted alkenyl group, a substituted or unsubstituted cycloalkenyl group, a substituted or unsubstituted cycloalkyl group, a substituted or unsubstituted aryl group, a substituted or unsubstituted aralkyl group, a substituted or unsubstituted alkylaryl group, a substituted or unsubstituted heteroaryl group, a substituted or unsubstituted aryloxy group, a substituted or unsubstituted alkoxy group, a substituted or unsubstituted ester group, a substituted or unsubstituted carbonate group, a substituted or unsubstituted ketone group, a substituted or unsubstituted aldehyde group, a substituted or unsubstituted imine group, a substituted or unsubstituted carboxyl group, a substituted or unsubstituted amido group, a substituted or unsubstituted urethane group, a substituted or unsubstituted urea group, a substituted or unsubstituted tetrazine group, a substituted or unsubstituted amino group, iodo, bromo, chloro, fluoro, a cyano group, a nitro group, a hydroxyl group, a thiol, an alkyl thioether, an aryl thioether, or a substituted or unsubstituted alcohol group; and wherein any two adjacent R¹ to R⁸ groups represent the atoms necessary to complete a fused ring structure linking the two adjacent groups together, which ring structure includes at least one substituent comprising a substituted or unsubstituted diaryl ketone moiety represented by general formula (A):

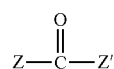

(A)

wherein Z and Z' are the same or different and are independently a substituted or unsubstituted aryl group or a substituted or unsubstituted heteroaryl group.

Examples of a preferred substituted or unsubstituted aryl group for inclusion in general formula (A) as Z and/or Z' include a substituted or unsubstituted phenyl or naphthyl group.

In accordance with a further aspect of the present invention there is provided photoswitchable photoinitiator comprising a naphthopyran represented by general formula (II):

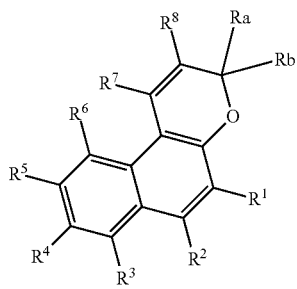

(II)

wherein Ra, Rb, and R¹-R⁸ are the same or different and represent hydrogen, deuterium, a substituted or unsubstituted alkyl group, a substituted or unsubstituted alkenyl group, a substituted or unsubstituted cycloalkenyl group, a substituted or unsubstituted cycloalkyl group, a substituted or unsubstituted aryl group, a substituted or unsubstituted aralkyl group, a substituted or unsubstituted alkylaryl group, a substituted or unsubstituted heteroaryl group, a substituted or unsubstituted aryloxy group, a substituted or unsubstituted alkoxy group, a substituted or unsubstituted ester group, a substituted or unsubstituted carbonate group, a substituted or unsubstituted ketone group, a substituted or unsubstituted aldehyde group, a substituted or unsubstituted imine group, a substituted or unsubstituted carboxyl group, a substituted or unsubstituted amido group, a substituted or unsubstituted urethane group, a substituted or unsubstituted urea group, a substituted or unsubstituted tetrazine group, a substituted or unsubstituted amino group, iodo, bromo, chloro, fluoro, a cyano group, a nitro group, a hydroxyl group, a thiol, an alkyl thioether, an aryl thioether, or a substituted or unsubstituted alcohol group; wherein at least one of Ra, Rb, and R¹-R⁸ comprises a substituted or unsubstituted diaryl ketone moiety represented by general formula (A):

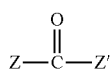

(A)

wherein Z and Z' are the same or different and are independently a substituted or unsubstituted aryl group or a substituted or unsubstituted heteroaryl group.

Examples of a preferred substituted or unsubstituted aryl group for inclusion in general formula (A) as Z and/or Z' include a substituted or unsubstituted phenyl or naphthyl group.

In accordance with yet another aspect of the present invention, there is provided a photoswitchable photoinitiator comprising a naphthopyran molecule represented by general formula (I):

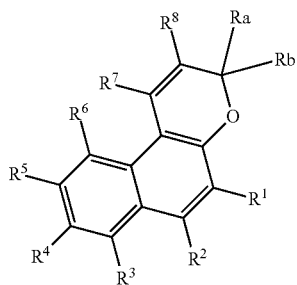

(II)

wherein Ra, Rb, and $R^1$-$R^8$ are the same or different and represent hydrogen, deuterium, a substituted or unsubstituted alkyl group, a substituted or unsubstituted alkenyl group, a substituted or unsubstituted cycloalkenyl group, a substituted or unsubstituted cycloalkyl group, a substituted or unsubstituted aryl group, a substituted or unsubstituted aralkyl group, a substituted or unsubstituted alkylaryl group, a substituted or unsubstituted heteroaryl group, a substituted or unsubstituted aryloxy group, a substituted or unsubstituted alkoxy group, a substituted or unsubstituted ester group, a substituted or unsubstituted carbonate group, a substituted or unsubstituted ketone group, a substituted or unsubstituted aldehyde group, a substituted or unsubstituted imine group, a substituted or unsubstituted carboxyl group, a substituted or unsubstituted amido group, a substituted or unsubstituted urethane group, a substituted or unsubstituted urea group, a substituted or unsubstituted tetrazine group, a substituted or unsubstituted amino group, iodo, bromo, chloro, fluoro, a cyano group, a nitro group, a hydroxyl group, a thiol, an alkyl thioether, an aryl thioether, or a substituted or unsubstituted alcohol group; and wherein any two adjacent $R^1$ to $R^8$ groups represent the atoms necessary to complete a fused ring structure linking the two adjacent groups together, which ring structure includes at least one substituent comprising a substituted or unsubstituted diaryl ketone moiety represented by general formula (A):

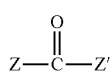

(A)

wherein Z and Z' are the same or different and are independently a substituted or unsubstituted aryl group or a substituted or unsubstituted heteroaryl group.

Examples of a preferred substituted or unsubstituted aryl group for inclusion in general formula (A) as Z and/or Z' include a substituted or unsubstituted phenyl or naphthyl group.

In accordance with still another aspect of the present invention there is provided a photohardenable composition comprising a photohardenable component and a photoswitchable photoinitiator, wherein the photoswitchable photoinitiator is activatable by exposure to light having a first wavelength and light having a second wavelength to induce a crosslinking or polymerization reaction in the photohardenable component, wherein the first and second wavelengths are different, and wherein the photoswitchable photoinitiator comprises a naphthopyran molecule including one or more substituents wherein at least one substituent comprises a substituted or unsubstituted diaryl ketone moiety represented by general formula (A):

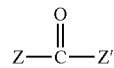

(A)

wherein Z and Z' are the same or different and are independently a substituted or unsubstituted aryl group or a substituted or unsubstituted heteroaryl group.

Examples of a preferred substituted or unsubstituted aryl group for inclusion in general formula (A) as Z and/or Z' include a substituted or unsubstituted phenyl or naphthyl group.

In accordance with still another aspect of the present invention there is provided a photohardenable composition comprising a photohardenable component and a photoswitchable photoinitiator, wherein the photoswitchable photoinitiator is activatable by exposure to light having a first wavelength and light having a second wavelength to induce a crosslinking or polymerization reaction in the photohardenable component, wherein the first and second wavelengths are different, and wherein the photoswitchable photoinitiator comprises a naphthopyran molecule represented by general formula (I):

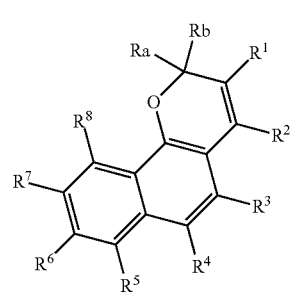

(I)

wherein Ra, Rb, and $R^1$-$R^8$ are the same or different and represent hydrogen, deuterium, a substituted or unsubstituted alkyl group, a substituted or unsubstituted alkenyl group, a substituted or unsubstituted cycloalkenyl group, a substituted or unsubstituted cycloalkyl group, a substituted or unsubstituted aryl group, a substituted or unsubstituted aralkyl group, a substituted or unsubstituted alkylaryl group, a substituted or unsubstituted heteroaryl group, a substituted or unsubstituted aryloxy group, a substituted or unsubstituted alkoxy group, a substituted or unsubstituted ester group, a substituted or unsubstituted carbonate group, a substituted or unsubstituted ketone group, a substituted or unsubstituted aldehyde group, a substituted or unsubstituted imine group, a substituted or unsubstituted carboxyl group, a substituted or unsubstituted amido group, a substituted or unsubstituted urethane group, a substituted or unsubstituted urea group, a substituted or unsubstituted tetrazine group, a substituted or unsubstituted amino group, iodo, bromo, chloro, fluoro, a cyano group, a nitro group, a hydroxyl group, a thiol, an alkyl thioether, an aryl thioether, or a substituted or unsubstituted alcohol group; wherein at least one of Ra, Rb, and $R^1$-$R^8$ comprises a substituted or unsubstituted diaryl ketone moiety represented by general formula (A):

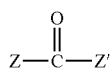

(A)

wherein Z and Z' are the same or different and are independently a substituted or unsubstituted aryl group or a substituted or unsubstituted heteroaryl group.

Examples of a preferred substituted or unsubstituted aryl group for inclusion in general formula (A) as Z and/or Z' include a substituted or unsubstituted phenyl or naphthyl group.

In accordance with a still further aspect of the present invention there is provided a photohardenable composition comprising a photohardenable component and a photoswitchable photoinitiator, wherein the photoswitchable photoinitiator is activatable by exposure to light having a first wavelength and light having a second wavelength to induce a crosslinking or polymerization reaction in the photohardenable component, wherein the first and second wavelengths are different, and wherein photoswitchable photoinitiator comprising a naphthopyran molecule represented by general formula (II):

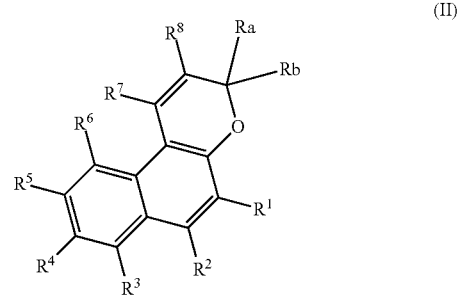

(II)

wherein Ra, Rb, and $R^1$-$R^8$ are the same or different and represent hydrogen, deuterium, a substituted or unsubstituted alkyl group, a substituted or unsubstituted alkenyl group, a substituted or unsubstituted cycloalkenyl group, a substituted or unsubstituted cycloalkyl group, a substituted or unsubstituted aryl group, a substituted or unsubstituted aralkyl group, a substituted or unsubstituted alkylaryl group, a substituted or unsubstituted heteroaryl group, a substituted or unsubstituted aryloxy group, a substituted or unsubstituted alkoxy group, a substituted or unsubstituted ester group, a substituted or unsubstituted carbonate group, a substituted or unsubstituted ketone group, a substituted or unsubstituted aldehyde group, a substituted or unsubstituted imine group, a substituted or unsubstituted carboxyl group, a substituted or unsubstituted amido group, a substituted or unsubstituted urethane group, a substituted or unsubstituted urea group, a substituted or unsubstituted tetrazine group, a substituted or unsubstituted amino group, iodo, bromo, chloro, fluoro, a cyano group, a nitro group, a hydroxyl group, a thiol, an alkyl thioether, an aryl thioether, or a substituted or unsubstituted alcohol group; wherein at least one of Ra, Rb, and $R^1$-$R^8$ comprises a substituted or unsubstituted diaryl ketone moiety represented by general formula (A):

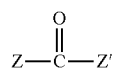

(A)

wherein Z and Z' are the same or different and are independently a substituted or unsubstituted aryl group or a substituted or unsubstituted heteroaryl group.

Examples of a preferred substituted or unsubstituted aryl group for inclusion in general formula (A) as Z and/or Z' include a substituted or unsubstituted phenyl or naphthyl group.

In accordance with a still further aspect of the present invention there is provided photohardenable composition comprising a photohardenable component and a photoswitchable photoinitiator, wherein the photoswitchable photoinitiator is activatable by exposure to light having a first wavelength and light having a second wavelength to induce a crosslinking or polymerization reaction in the photohardenable component, wherein the first and second wavelengths are different, and wherein the photoswitchable photoinitiator comprises a naphthopyran molecule represented by general formula (I):

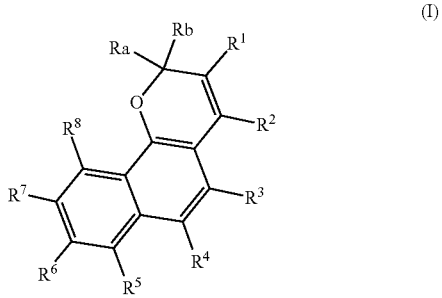

(I)

wherein Ra, Rb, and $R^1$-$R^8$ are the same or different and represent hydrogen, deuterium, a substituted or unsubstituted alkyl group, a substituted or unsubstituted alkenyl group, a substituted or unsubstituted cycloalkenyl group, a substituted or unsubstituted cycloalkyl group, a substituted or unsubstituted aryl group, a substituted or unsubstituted aralkyl group, a substituted or unsubstituted alkylaryl group, a substituted or unsubstituted heteroaryl group, a substituted or unsubstituted aryloxy group, a substituted or unsubstituted alkoxy group, a substituted or unsubstituted ester group, a substituted or unsubstituted carbonate group, a substituted or unsubstituted ketone group, a substituted or unsubstituted aldehyde group, a substituted or unsubstituted imine group, a substituted or unsubstituted carboxyl group, a substituted or unsubstituted amido group, a substituted or unsubstituted urethane group, a substituted or unsubstituted urea group, a substituted or unsubstituted tetrazine group, a substituted or unsubstituted amino group, iodo, bromo, chloro, fluoro, a cyano group, a nitro group, a hydroxyl group, a thiol, an alkyl thioether, an aryl thioether, or a substituted or unsubstituted alcohol group; and wherein any two adjacent $R^1$ to $R^8$ groups represent the atoms necessary to complete a fused ring structure linking the two adjacent groups together, which ring structure includes at least one substituent comprising a substituted or unsubstituted diaryl ketone moiety represented by general formula (A):

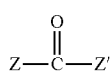

(A)

wherein Z and Z' are the same or different and are independently a substituted or unsubstituted aryl group or a substituted or unsubstituted heteroaryl group.

Examples of a preferred substituted or unsubstituted aryl group for inclusion in general formula (A) as Z and/or Z' include a substituted or unsubstituted phenyl or naphthyl group.

In accordance with a still further aspect of the present invention there is provided photohardenable composition comprising a photohardenable component and a photoswitchable photoinitiator, wherein the photoswitchable photoinitiator is activatable by exposure to light having a first wavelength and light having a second wavelength to induce a crosslinking or polymerization reaction in the photohardenable component, wherein the first and second wavelengths are different, and wherein photoswitchable photoinitiator comprising a naphthopyran molecule represented by general formula (II):

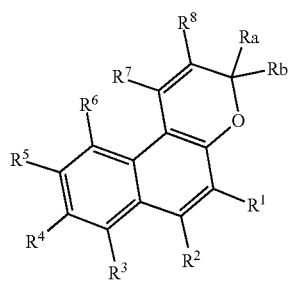

(II)

wherein Ra, Rb, and $R^1$-$R^8$ are the same or different and represent hydrogen, deuterium, a substituted or unsubstituted alkyl group, a substituted or unsubstituted alkenyl group, a substituted or unsubstituted cycloalkenyl group, a substituted or unsubstituted cycloalkyl group, a substituted or unsubstituted aryl group, a substituted or unsubstituted aralkyl group, a substituted or unsubstituted alkylaryl group, a substituted or unsubstituted heteroaryl group, a substituted or unsubstituted aryloxy group, a substituted or unsubstituted alkoxy group, a substituted or unsubstituted ester group, a substituted or unsubstituted carbonate group, a substituted or unsubstituted ketone group, a substituted or unsubstituted aldehyde group, a substituted or unsubstituted imine group, a substituted or unsubstituted carboxyl group, a substituted or unsubstituted amido group, a substituted or unsubstituted urethane group, a substituted or unsubstituted urea group, a substituted or unsubstituted tetrazine group, a substituted or unsubstituted amino group, iodo, bromo, chloro, fluoro, a cyano group, a nitro group, a hydroxyl group, a thiol, an alkyl thioether, an aryl thioether, or a substituted or unsubstituted alcohol group; and wherein any two adjacent $R^1$ to $R^8$ groups represent the atoms necessary to complete a fused ring structure linking the two adjacent groups together, which ring structure includes at least one substituent comprising a substituted or unsubstituted diaryl ketone moiety represented by general formula (A):

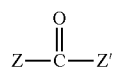

(A)

wherein Z and Z' are the same or different and are independently a substituted or unsubstituted aryl group or a substituted or unsubstituted heteroaryl group.

Examples of a preferred substituted or unsubstituted aryl group for inclusion in general formula (A) as Z and/or Z' include a substituted or unsubstituted phenyl or naphthyl group.

Photohardenable compositions in accordance with the present invention can optionally further include a coinitiator (also called a synergist).

Photohardenable compositions in accordance with the present invention can optionally further include a sensitizer.

Optionally photohardenable compositions in accordance with the present invention can include one or more coinitiators and/or one or more sensitizers.

Preferably photohardenable compositions in accordance with the present invention display non-Newtonian rheological behavior.

In accordance with still another aspect of the present invention, there is provided a method of forming an object, the method comprising: (a) providing a volume including a photohardenable composition in accordance with the present invention, (b) simultaneously or sequentially irradiating one or more selected locations within the volume of the photohardenable composition with light having a first wavelength and light having a second wavelength, wherein light having the first wavelength and light having the second wavelength activate the photoswitchable photoinitiator at the one or more selected locations and at least partially harden the photohardenable composition at the one or more selected locations within the volume to at least partially form the object, wherein the object at least partially formed in the photohardenable composition remains at a fixed position or is minimally displayed in the unhardened photohardenable composition during formation; and (c) optionally repeating step b, irradiating the photohardenable composition at one or more of the same or different locations in the volume until the object is partially or fully formed.

Preferably a method in accordance with the present invention includes a photohardenable composition that displays non-Newtonian rheological behavior.

As used herein, unless otherwise provided: "alkyl" includes alkyl groups having 1 to 20 (more typically 1 to 10) carbon atoms which may be straight chain, branched chain, or cyclic alkyl groups; "alkoxy" includes alkoxy groups having 1 to 20 (more typically 1 to 10) carbon atoms which may be straight chain, branched chain, or cyclic alkoxy groups, examples of which include, but are not limited to, methoxy, ethoxy, etc.; "aralkyl" includes aralkyl groups having 7 to 20 carbon atoms, examples of which include, but are not limited to, benzyl; "alkylaryl" includes alkylaryl groups having 7 to 20 carbon atoms, examples of which include, but are not limited to, methylphenyl, ethylphenyl, etc.; "amido" includes groups of the structure —CONR$_2$ and "carboxy ester" includes groups of the structure —COOR or —OCOR wherein R can represent, for examples, but is not limited to, hydrogen, alkyl, or aryl in the case of either the amido group or the carboxy ester.

As used herein, unless otherwise provided, "aryl" refers to any aromatic carbocyclic or heterocyclic group containing unsaturated C—C bonds in conjugation with one another. An aryl group can include, for example, 5 to 20 carbon atoms, examples of which include, but are not limited to, phenyl, naphthyl, phenanthryl, etc. Examples of "aryl" substituents include, but are not limited to phenyl, napthyl, anthranyl or any aromatic heterocyclic group such as pyridine, pyrazine, indole, purine, furan, thiophene, pyrrole and the like.

As used herein, unless otherwise provided, a "substituted" group, moiety, or molecule refers to a group, moiety, or molecule having at least one hydrogen that is substituted with a group of atoms or a non-hydrogen atom. (A group of atoms or non-hydrogen atom that replaces a hydrogen is also typically referred to as a substituent.) Examples of various substituents include, but are not limited to, alkyl, cycloalkyl, alkenyl, cycloalkenyl, ether, aryl, heteroaryl, heterocycloalkyl, hydroxyl, oxy, alkoxyl, ester, thioester, acyl, carboxyl, carbonyl, cyano, nitro, amino, amido, halo (e.g., fluoro, chloro, bromo, iodo), or sulfur. When a substituted group includes more than one substituent, the substituents can be bound to the same atom in the group or two or more different atoms. A substituent including a group of atoms can optionally also be substituted.

The foregoing, and other aspects and embodiments described herein and contemplated by this disclosure all constitute embodiments of the present invention.

It should be appreciated by those persons having ordinary skill in the art(s) to which the present invention relates that any of the features described herein in respect of any particular aspect and/or embodiment of the present invention can be combined with one or more of any of the other features of any other aspects and/or embodiments of the present invention described herein, with modifications as appropriate to ensure compatibility of the combinations. Such combinations are considered to be part of the present invention contemplated by this disclosure.

It is to be understood that both the foregoing general description and the following detailed description are exemplary and explanatory only and are not restrictive of the invention as claimed.

Other embodiments will be apparent to those skilled in the art from consideration of the description, from the claims, and from practice of the invention disclosed herein.

DETAILED DESCRIPTION OF THE INVENTION

Various aspects and embodiments of the present invention will be further described in the following detailed description.

The present invention includes a photoswitchable photoinitiator comprising a naphthopyran molecule including a substituent comprising a substituted or unsubstituted diaryl ketone moiety. The present invention also includes photohardenable compositions and methods for forming an object in a volume and products thereof, which photohardenable compositions and methods include a photoswitchable photoinitiator comprising a naphthopyran molecule including one or more substituents at least one of which comprises a substituted or unsubstituted diaryl ketone moiety.

Advantageously including a substituent comprising a diaryl ketone moiety, e.g., a benzophenone moiety, on a photoswitchable photoinitiator comprising a substituted or unsubstituted naphthopyran molecule allows the efficient formation of triplet excitons on the open form of the substituted naphthopyran molecule upon absorption of a second wavelength of light, said triplet excitons providing efficient photoinitiation through electron, hydrogen, or energy transfer with a suitable coinitiator (also called a synergist; e.g., amine or alkyltriarylborate). Advantageously, without wishing to be held by theory, the diaryl ketone moieties described herein can facilitate high solubilities of the substituted naphthopyran molecule in solvents and photohardenable compositions as compared to a more compact and less sterically hindered monoaryl ketone, e.g., a benzoyl group.

In accordance with one aspect of the present invention there is provided a photoswitchable photoinitiator comprising a naphthopyran molecule including one or more substituents wherein at least one substituent comprises a substituted or unsubstituted diaryl ketone moiety represented by general formula (A):

(A)

wherein Z and Z' are the same or different and are independently a substituted or unsubstituted aryl group or a substituted or unsubstituted heteroaryl group.

Preferred substituents comprising a substituted or unsubstituted diaryl ketone moiety represented by general formula (A) comprise substituted or unsubstituted benzophenone moieties.

In certain embodiments, a substituent comprising a substituted or unsubstituted diaryl ketone moiety represented by general formula (A) is a substituted or unsubstituted diaryl ketone moiety represented by general formula (A).

In certain embodiments, a substituent comprising a substituted or unsubstituted diaryl ketone moiety represented by general formula (A) is a substituted or unsubstituted benzophenone moiety.

In accordance with another aspect of the present invention, there is provided a photoswitchable photoinitiator comprising a naphthopyran molecule represented by general formula (I):

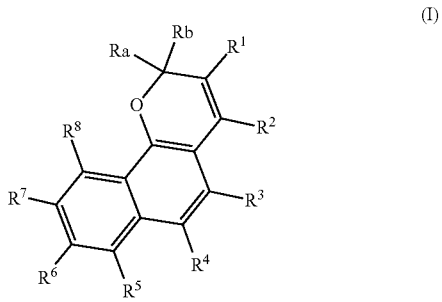

(I)

wherein Ra, Rb, and $R^1$-$R^8$ are the same or different and represent hydrogen, deuterium, a substituted or unsubstituted alkyl group, a substituted or unsubstituted alkenyl group, a substituted or unsubstituted cycloalkenyl group, a substituted or unsubstituted cycloalkyl group, a substituted or unsubstituted aryl group, a substituted or unsubstituted aralkyl group, a substituted or unsubstituted alkylaryl group, a substituted or unsubstituted heteroaryl group, a substituted or unsubstituted aryloxy group, a substituted or unsubstituted alkoxy group, a substituted or unsubstituted ester group, a substituted or unsubstituted carbonate group, a substituted or unsubstituted ketone group, a substituted or unsubstituted aldehyde group, a substituted or unsubstituted imine group, a substituted or unsubstituted carboxyl group, a substituted or unsubstituted amido group, a substituted or unsubstituted urethane group, a substituted or unsubstituted urea group, a substituted or unsubstituted tetrazine group, a substituted or unsubstituted amino group, iodo, bromo, chloro, fluoro, a cyano group, a nitro group, a hydroxyl group, a thiol, an alkyl thioether, an aryl thioether, or a substituted or unsubstituted alcohol group; wherein at least one of Ra, Rb, and $R^1$-$R^8$ comprises a substituted or unsubstituted diaryl ketone moiety represented by general formula (A):

(A)

wherein Z and Z' are the same or different and are independently a substituted or unsubstituted aryl group or a substituted or unsubstituted heteroaryl group.

Preferred substituents comprising a substituted or unsubstituted diaryl ketone moiety represented by general formula (A) comprise substituted or unsubstituted benzophenone moieties.

In certain embodiments, the at least one of Ra, Rb, and $R^1$-$R^8$ comprising a substituted or unsubstituted diaryl ketone moiety represented by general formula (A) is the substituted or unsubstituted diaryl ketone moiety represented by general formula (A).

In certain embodiments, the at least one of Ra, Rb, and $R^1$-$R^8$ comprising a substituted or unsubstituted diaryl ketone moiety represented by general formula (A) is a substituted or unsubstituted benzophenone moiety.

Preferably Ra and Rb are the same or different and can comprise a substituted or unsubstituted aryl C6-C20 group or a substituted or unsubstituted C4-C19 heteroaryl group. Examples of preferred substituted or unsubstituted aryl groups include, but are not limited to, comprises a substituted or unsubstituted phenyl or naphthyl group.

Optionally, any two adjacent $R^1$-$R^8$ groups can represent the atoms necessary to complete a fused ring structure linking the two adjacent groups together, which ring structure is substituted or unsubstituted. In such case, the fused ring structure can include at least one substituent comprising a substituted of unsubstituted diaryl ketone moiety represented by general formula (A).

In accordance with another aspect of the present invention, there is provided a photoswitchable photoinitiator comprising a naphthopyran represented by general formula (I):

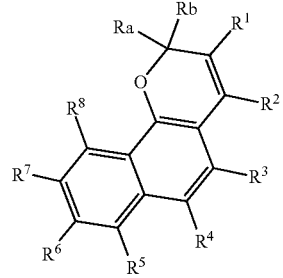

(I)

wherein Ra, Rb, and $R^1$-$R^8$ are the same or different and represent hydrogen, deuterium, a substituted or unsubstituted alkyl group, a substituted or unsubstituted alkenyl group, a substituted or unsubstituted cycloalkenyl group, a substituted or unsubstituted cycloalkyl group, a substituted or unsubstituted aryl group, a substituted or unsubstituted aralkyl group, a substituted or unsubstituted alkylaryl group, a substituted or unsubstituted heteroaryl group, a substituted or unsubstituted aryloxy group, a substituted or unsubstituted alkoxy group, a substituted or unsubstituted ester group, a substituted or unsubstituted carbonate group, a substituted or unsubstituted ketone group, a substituted or unsubstituted aldehyde group, a substituted or unsubstituted imine group, a substituted or unsubstituted carboxyl group, a substituted or unsubstituted amido group, a substituted or unsubstituted urethane group, a substituted or unsubstituted urea group, a substituted or unsubstituted tetrazine group, a substituted or unsubstituted amino group, iodo, bromo, chloro, fluoro, a cyano group, a nitro group, a hydroxyl group, a thiol, an alkyl thioether, an aryl thioether, or a substituted or unsubstituted alcohol group; and wherein any two adjacent $R^1$ to $R^8$ groups represent the atoms necessary to complete a fused ring structure linking the two adjacent groups together, which ring structure includes at least one substituent comprising a substituted or unsubstituted diaryl ketone moiety represented by general formula (A):

(A)

wherein Z and Z' are the same or different and are independently a substituted or unsubstituted aryl group or a substituted or unsubstituted heteroaryl group.

Preferably Ra and Rb are the same or different and can comprise a substituted or unsubstituted aryl C6-C20 group or a substituted or unsubstituted C4-C19 heteroaryl group. Examples of preferred substituted or unsubstituted aryl groups include, but are not limited to, comprises a substituted or unsubstituted phenyl or naphthyl group.

Preferred substituents comprising a substituted or unsubstituted diaryl ketone moiety represented by general formula (A) comprise substituted or unsubstituted benzophenone moieties.

In certain embodiments, the at least one substituent comprising a substituted or unsubstituted diaryl ketone moiety represented by general formula (A) is the substituted or unsubstituted diaryl ketone moiety represented by general formula (A).

In certain embodiments, the at least one substituent comprising a substituted or unsubstituted diaryl ketone moiety represented by general formula (A) is a substituted or unsubstituted benzophenone moiety.

Examples of photoswitchable photoinitiators in accordance with the present invention represented by formula (I) include, but are not limited to, photoswitchable photoinitiators represented by following formulae (III)-(V):

(III)

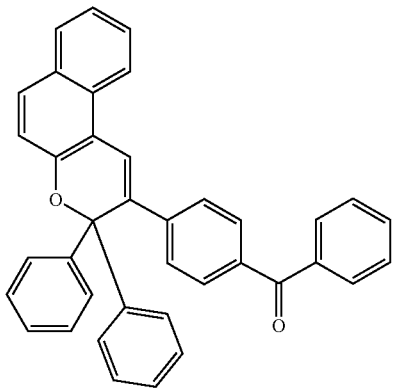

(IV)

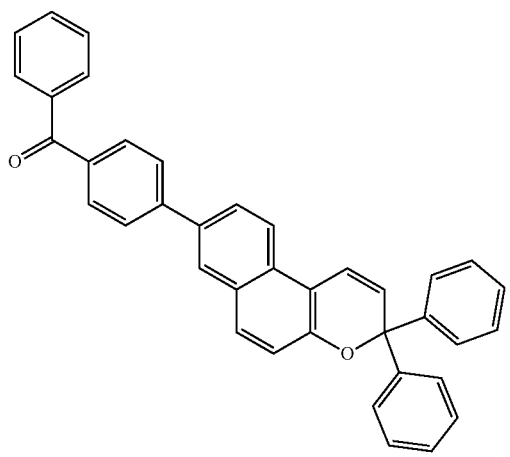

(V)

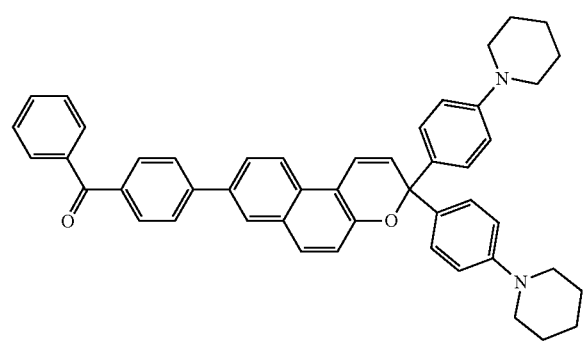

In accordance with another aspect of the present invention, there is provided a photoswitchable photoinitiator comprising a naphthopyran molecule represented by general formula (II):

(II)

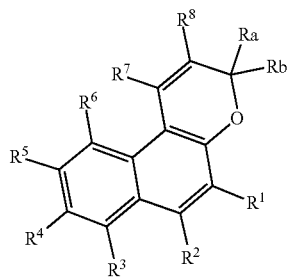

wherein Ra, Rb, and $R^1$-$R^8$ are the same or different and represent hydrogen, deuterium, a substituted or unsubstituted alkyl group, a substituted or unsubstituted alkenyl group, a substituted or unsubstituted cycloalkenyl group, a substituted or unsubstituted cycloalkyl group, a substituted or unsubstituted aryl group, a substituted or unsubstituted aralkyl group, a substituted or unsubstituted alkylaryl group, a substituted or unsubstituted heteroaryl group, a substituted or unsubstituted aryloxy group, a substituted or unsubstituted alkoxy group, a substituted or unsubstituted ester group, a substituted or unsubstituted carbonate group, a substituted or unsubstituted ketone group, a substituted or unsubstituted aldehyde group, a substituted or unsubstituted imine group, a substituted or unsubstituted carboxyl group, a substituted or unsubstituted amido group, a substituted or unsubstituted urethane group, a substituted or unsubstituted urea group, a substituted or unsubstituted tetrazine group, a substituted or unsubstituted amino group, iodo, bromo, chloro, fluoro, a cyano group, a nitro group, a hydroxyl group, a thiol, an alkyl thioether, an aryl thioether, or a substituted or unsubstituted alcohol group; wherein at least one of Ra, Rb, and $R^1$-$R^8$ comprises a substituted or unsubstituted diaryl ketone moiety represented by general formula (A):

(A)

wherein Z and Z' are the same or different and are independently a substituted or unsubstituted aryl group or a substituted or unsubstituted heteroaryl group.

Preferably Ra and Rb are the same or different and can comprise a substituted or unsubstituted aryl C6-C20 group or a substituted or unsubstituted C4-C19 heteroaryl group. Examples of preferred substituted or unsubstituted aryl groups include, but are not limited to, comprises a substituted or unsubstituted phenyl or naphthyl group.

Optionally, any two adjacent $R^1$-$R^8$ groups can represent the atoms necessary to complete a fused ring structure linking the two adjacent groups together, which ring structure is substituted or unsubstituted. In such case, the fused ring structure can include at least one substituent comprising a substituted of unsubstituted diaryl ketone moiety represented by general formula (A).

Preferred substituents comprising a substituted or unsubstituted diaryl ketone moiety represented by general formula (A) comprise substituted or unsubstituted benzophenone moieties.

In certain embodiments, the at least one of Ra, Rb, and $R^1$-$R^8$ comprising a substituted or unsubstituted diaryl ketone moiety represented by general formula (A) is the substituted or unsubstituted diaryl ketone moiety represented by general formula (A).

In certain embodiments, the at least one of Ra, Rb, and $R^1$-$R^8$ comprising a substituted or unsubstituted diaryl ketone moiety represented by general formula (A) is a substituted or unsubstituted benzophenone moiety.

In accordance with another aspect of the present invention, there is provided a photoswitchable photoinitiator comprising a naphthopyran represented by general formula (II):

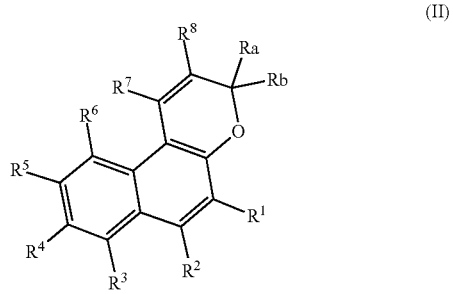

(II)

wherein Ra, Rb, and $R^1$-$R^8$ are the same or different and represent hydrogen, deuterium, a substituted or unsubstituted alkyl group, a substituted or unsubstituted alkenyl group, a substituted or unsubstituted cycloalkenyl group, a substituted or unsubstituted cycloalkyl group, a substituted or unsubstituted aryl group, a substituted or unsubstituted aralkyl group, a substituted or unsubstituted alkylaryl group, a substituted or unsubstituted heteroaryl group, a substituted or unsubstituted aryloxy group, a substituted or unsubstituted alkoxy group, a substituted or unsubstituted ester group, a substituted or unsubstituted carbonate group, a substituted or unsubstituted ketone group, a substituted or unsubstituted aldehyde group, a substituted or unsubstituted imine group, a substituted or unsubstituted carboxyl group, a substituted or unsubstituted amido group, a substituted or unsubstituted urethane group, a substituted or unsubstituted urea group, a substituted or unsubstituted tetrazine group, a substituted or unsubstituted amino group, iodo, bromo, chloro, fluoro, a cyano group, a nitro group, a hydroxyl group, a thiol, an alkyl thioether, an aryl thioether, or a substituted or unsubstituted alcohol group; and wherein any two adjacent $R^1$ to $R^8$ groups represent the atoms necessary to complete a fused ring structure linking the two adjacent groups together, which ring structure includes at least one substituent comprising a substituted or unsubstituted diaryl ketone moiety represented by general formula (A):

(A)

wherein Z and Z' are the same or different and are independently a substituted or unsubstituted aryl group or a substituted or unsubstituted heteroaryl group.

Preferably Ra and Rb are the same or different and can comprise a substituted or unsubstituted aryl C6-C20 group or a substituted or unsubstituted C4-C19 heteroaryl group. Examples of preferred substituted or unsubstituted aryl groups include, but are not limited to, comprises a substituted or unsubstituted phenyl or naphthyl group.

Preferred substituents comprising a substituted or unsubstituted diaryl ketone moiety represented by general formula (A) comprise substituted or unsubstituted benzophenone moieties.

In certain embodiments, the at least one substituent comprising a substituted or unsubstituted diaryl ketone moiety represented by general formula (A) is the substituted or unsubstituted diaryl ketone moiety represented by general formula (A).

In certain embodiments, the at least one substituent comprising a substituted or unsubstituted diaryl ketone moiety represented by general formula (A) is a substituted or unsubstituted benzophenone moiety.

Examples of photoswitchable photoinitiators in accordance with the present invention represented by formula (II) include, but are not limited to, those represented by following structure (VI):

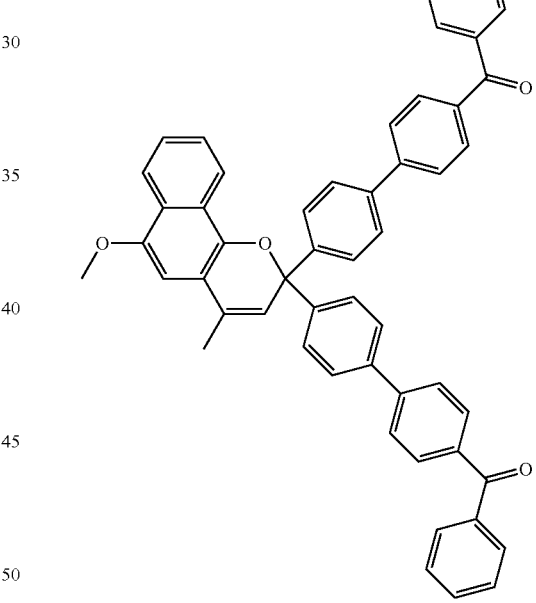

(VI)

(In various formulae depicted herein, e.g., formula (VI) above, a methyl group is represented simply as a line extending from an atom or a ring structure.)

Photoswitchable photoinitiators described herein preferably possess photochromic properties and can be converted to a second form (or active form) upon irradiation with light of a first wavelength, which second form can be converted to an excited state upon irradiation with light of a second wavelength, the second state being capable of inducing hardening of a photohardenable component. The conversion of the photoswitchable photoinitiators described herein to a second form of the molecule (e.g., an isomer thereof, e.g., for a photochromic molecule having a closed ring structure to a second from which is an open ring form thereof) is preferably a reversible photochemical structural change.

Preferred photoswitchable photoinitiators in accordance with the present invention undergo reversible intramolecular transformations forming the open isomeric form (open) by irradiation (photochromic) and can also undergo reversible intramolecule transformations forming the open isomeric form by heating. Such preferred photoswitchable photoinitiators can function by light activated opening of the naphthopyran ring to form the open isomer form (active form). The active form may subsequently absorb light of a different wavelength to form an excited state of the active form which may subsequently induce photoinitiation, either alone or in combination with a co-initiator (e.g., amine, thiol, organoborate compounds, onium salts) or sensitizer.

An example of the photochemical structural change for a naphthopyran molecule represented by general formula (I) is shown by the following equation (I):

Equation (I)

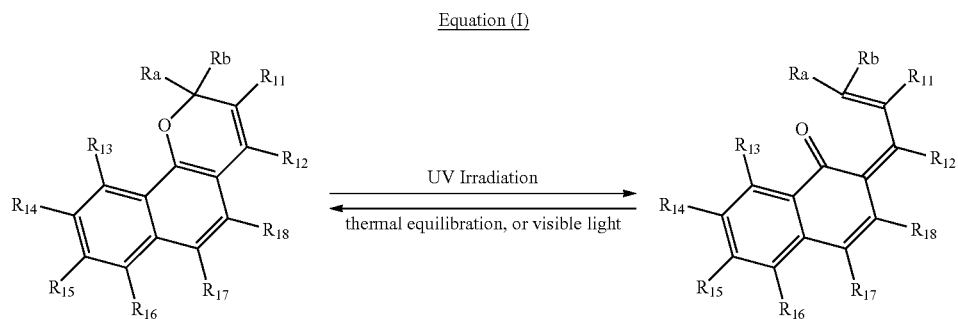

An example of the photochemical structural change for a naphthopyran molecule represented by general formula (II) is shown by the following equation (II):

Equation (II)

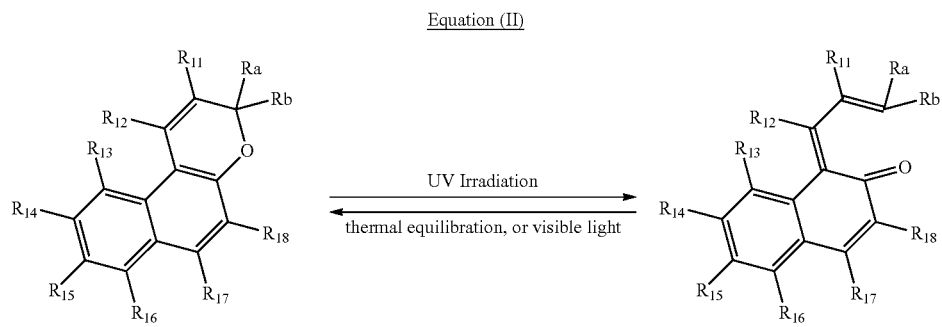

(In the above Equations 1 and 2, Ra, Rb, and $R^{11}$-$R^{18}$ can be the same or different and can independently include any of the groups listed for Ra, Rb, and $R^1$-$R^8$ above.)

A photoswitchable photoinitiator comprising a naphthopyran molecule including a substituent comprising a substituted or unsubstituted diaryl ketone can be prepared utilizing known synthetic techniques. For example, a substituent comprising a diaryl ketone, e.g., a benzophenone moiety, may be attached as a substituent to a bromine- or iodine-substituted naphthopyran molecule via, e.g., palladium-catalyzed cross-coupling reactions, with high yield, mild conditions, and synthetic versatility.

In accordance with another aspect of the present invention there is provided photohardenable composition comprising a photohardenable component and a photoswitchable photoinitiator, wherein the photoswitchable photoinitiator is activatable by exposure to light having a first wavelength and light having a second wavelength to induce a crosslinking or polymerization reaction in the photohardenable component, wherein the first and second wavelengths are different, and wherein the photoswitchable photoinitiator comprises a naphthopyran molecule including one or more substituents wherein at least one substituent comprises a substituted or unsubstituted diaryl ketone moiety represented by general formula (A):

(A)

wherein Z and Z' are the same or different and are independently a substituted or unsubstituted aryl group or a substituted or unsubstituted heteroaryl group.

Preferred substituents comprising a substituted or unsubstituted diaryl ketone moiety represented by general formula (A) comprise substituted or unsubstituted benzophenone moieties.

In certain embodiments, the at least one substituent comprising a substituted or unsubstituted diaryl ketone moiety represented by general formula (A) is the substituted or unsubstituted diaryl ketone moiety represented by general formula (A).

In certain embodiments, the at least one substituent comprising a substituted or unsubstituted diaryl ketone moiety represented by general formula (A) is a substituted or unsubstituted benzophenone moiety.

The photohardenable composition can optionally further include a coinitiator.

The photohardenable composition can optionally further include a sensitizer.

Optionally, the photohardenable composition can include a combination including one or more coinitiators and/or one or more sensitizers.

Preferably the photohardenable composition displays non-Newtonian rheological behavior.

In accordance with still another aspect of the present invention there is provided a photohardenable composition comprising a photohardenable component and a photoswitchable photoinitiator, wherein the photoswitchable photoinitiator is activatable by exposure to light having a first wavelength and light having a second wavelength to induce a crosslinking or polymerization reaction in the photohardenable component, wherein the first and second wavelengths are different, and wherein the photoswitchable photoinitiator comprises a naphthopyran molecule represented by general formula (I):

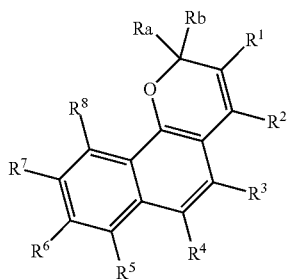

(I)

wherein Ra, Rb, and $R^1$-$R^8$ are the same or different and represent hydrogen, deuterium, a substituted or unsubstituted alkyl group, a substituted or unsubstituted alkenyl group, a substituted or unsubstituted cycloalkenyl group, a substituted or unsubstituted cycloalkyl group, a substituted or unsubstituted aryl group, a substituted or unsubstituted aralkyl group, a substituted or unsubstituted alkylaryl group, a substituted or unsubstituted heteroaryl group, a substituted or unsubstituted aryloxy group, a substituted or unsubstituted alkoxy group, a substituted or unsubstituted ester group, a substituted or unsubstituted carbonate group, a substituted or unsubstituted ketone group, a substituted or unsubstituted aldehyde group, a substituted or unsubstituted imine group, a substituted or unsubstituted carboxyl group, a substituted or unsubstituted amido group, a substituted or unsubstituted urethane group, a substituted or unsubstituted urea group, a substituted or unsubstituted tetrazine group, a substituted or unsubstituted amino group, iodo, bromo, chloro, fluoro, a cyano group, a nitro group, a hydroxyl group, a thiol, an alkyl thioether, an aryl thioether, or a substituted or unsubstituted alcohol group; wherein at least one of Ra, Rb, and $R^1$-$R^8$ comprises a substituted or unsubstituted diaryl ketone moiety represented by general formula (A):

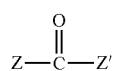

(A)

wherein Z and Z' are the same or different and are independently a substituted or unsubstituted aryl group or a substituted or unsubstituted heteroaryl group.

Preferably Ra and Rb are the same or different and can comprise a substituted or unsubstituted aryl C6-C20 group or a substituted or unsubstituted C4-C19 heteroaryl group. Examples of preferred substituted or unsubstituted aryl groups include, but are not limited to, comprises a substituted or unsubstituted phenyl or naphthyl group.

Optionally, any two adjacent $R^1$-$R^8$ groups can represent the atoms necessary to complete a fused ring structure linking the two adjacent groups together, which ring structure is substituted or unsubstituted. In such case, the fused ring structure can include at least one substituent comprising a substituted of unsubstituted diaryl ketone moiety represented by general formula (A).

Preferred substituents comprising a substituted or unsubstituted diaryl ketone moiety represented by general formula (A) comprise substituted or unsubstituted benzophenone moieties.

In certain embodiments, the at least one of Ra, Rb, and $R^1$-$R^8$ comprising a substituted or unsubstituted diaryl ketone moiety represented by general formula (A) is the substituted or unsubstituted diaryl ketone moiety represented by general formula (A).

In certain embodiments, the at least one of Ra, Rb, and $R^1$-$R^8$ comprising a substituted or unsubstituted diaryl ketone moiety represented by general formula (A) is a substituted or unsubstituted benzophenone moiety.

The photohardenable composition can optionally further include a coinitiator.

The photohardenable composition can optionally further include a sensitizer.

Optionally, the photohardenable composition can include a combination including one or more coinitiators and/or one or more sensitizers.

Preferably the photohardenable composition displays non-Newtonian rheological behavior.

In accordance with yet another aspect of the present invention there is provided a photohardenable composition comprising a photohardenable component and a photoswitchable photoinitiator, wherein the photoswitchable photoinitiator is activatable by exposure to light having a first wavelength and light having a second wavelength to induce a crosslinking or polymerization reaction in the photohardenable component, wherein the first and second wavelengths are different, and wherein the photoswitchable photoinitiator comprises a naphthopyran molecule represented by general formula (I):

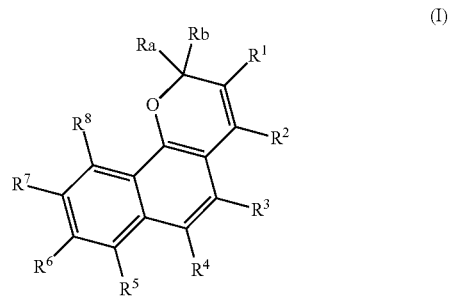

(I)

wherein Ra, Rb, and $R^1$-$R^8$ are the same or different and represent hydrogen, deuterium, a substituted or unsubstituted alkyl group, a substituted or unsubstituted alkenyl group, a substituted or unsubstituted cycloalkenyl group, a substituted or unsubstituted cycloalkyl group, a substituted or unsubstituted aryl group, a substituted or unsubstituted aralkyl group, a substituted or unsubstituted alkylaryl group, a substituted or unsubstituted heteroaryl group, a substituted or unsubstituted aryloxy group, a substituted or unsubstituted alkoxy group, a substituted or unsubstituted ester group, a substituted or unsubstituted carbonate group, a substituted or unsubstituted ketone group, a substituted or unsubstituted aldehyde group, a substituted or unsubstituted imine group, a substituted or unsubstituted carboxyl group, a substituted or unsubstituted amido group, a substituted or unsubstituted urethane group, a substituted or unsubstituted urea group, a substituted or unsubstituted tetrazine group, a substituted or unsubstituted amino group, iodo, bromo, chloro, fluoro, a cyano group, a nitro group, a hydroxyl group, a thiol, an alkyl thioether, an aryl thioether, or a substituted or unsubstituted alcohol group; and wherein any two adjacent $R^1$ to $R^8$ groups represent the atoms necessary to complete a fused ring structure linking the two adjacent groups together, which ring structure includes at least one substituent comprising a substituted or unsubstituted diaryl ketone moiety represented by general formula (A):

(A)

wherein Z and Z' are the same or different and are independently a substituted or unsubstituted aryl group or a substituted or unsubstituted heteroaryl group.

Preferably Ra and Rb are the same or different and can comprise a substituted or unsubstituted aryl C6-C20 group or a substituted or unsubstituted C4-C19 heteroaryl group. Examples of preferred substituted or unsubstituted aryl groups include, but are not limited to, comprises a substituted or unsubstituted phenyl or naphthyl group.

Preferred substituents comprising a substituted or unsubstituted diaryl ketone moiety represented by general formula (A) comprise substituted or unsubstituted benzophenone moieties.

In certain embodiments, the at least one substituent comprising a substituted or unsubstituted diaryl ketone moiety represented by general formula (A) is the substituted or unsubstituted diaryl ketone moiety represented by general formula (A).

In certain embodiments, the at least one substituent comprising a substituted or unsubstituted diaryl ketone moiety represented by general formula (A) is a substituted or unsubstituted benzophenone moiety.

The photohardenable composition can optionally further include a coinitiator.

The photohardenable composition can optionally further include a sensitizer.

Optionally, the photohardenable composition can include a combination including one or more coinitiators and/or one or more sensitizers.

Preferably the photohardenable composition displays non-Newtonian rheological behavior.

In accordance with another aspect of the present invention there is provided a photohardenable composition comprising a photohardenable component and a photoswitchable photoinitiator, wherein the photoswitchable photoinitiator is activatable by exposure to light having a first wavelength and light having a second wavelength to induce a crosslinking or polymerization reaction in the photohardenable component, wherein the first and second wavelengths are different, and wherein photoswitchable photoinitiator comprising a naphthopyran molecule represented by general formula (II):

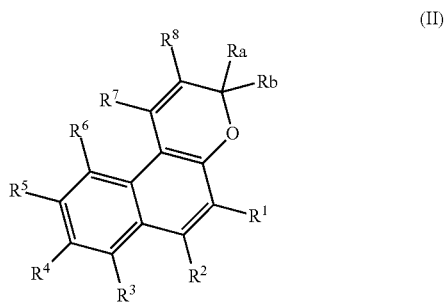

(II)

wherein Ra, Rb, and $R^1$-$R^8$ are the same or different and represent hydrogen, deuterium, a substituted or unsubstituted alkyl group, a substituted or unsubstituted alkenyl group, a substituted or unsubstituted cycloalkenyl group, a substituted or unsubstituted cycloalkyl group, a substituted or unsubstituted aryl group, a substituted or unsubstituted aralkyl group, a substituted or unsubstituted alkylaryl group, a substituted or unsubstituted heteroaryl group, a substituted or unsubstituted aryloxy group, a substituted or unsubstituted alkoxy group, a substituted or unsubstituted ester group, a substituted or unsubstituted carbonate group, a substituted or unsubstituted ketone group, a substituted or unsubstituted aldehyde group, a substituted or unsubstituted imine group, a substituted or unsubstituted carboxyl group, a substituted or unsubstituted amido group, a substituted or unsubstituted urethane group, a substituted or unsubstituted urea group, a substituted or unsubstituted tetrazine group, a substituted or unsubstituted amino group, iodo, bromo, chloro, fluoro, a cyano group, a nitro group, a hydroxyl group, a thiol, an alkyl thioether, an aryl thioether, or a substituted or unsubstituted alcohol group; wherein at least one of Ra, Rb, and $R^1$-$R^8$ comprises a substituted or unsubstituted diaryl ketone moiety represented by general formula (A):

(A)

wherein Z and Z' are the same or different and are independently a substituted or unsubstituted aryl group or a substituted or unsubstituted heteroaryl group.

Preferably Ra and Rb are the same or different and can comprise a substituted or unsubstituted aryl C6-C20 group or a substituted or unsubstituted C4-C19 heteroaryl group. Examples of preferred substituted or unsubstituted aryl groups include, but are not limited to, comprises a substituted or unsubstituted phenyl or naphthyl group.

Optionally, any two adjacent $R^1$-$R^8$ groups can represent the atoms necessary to complete a fused ring structure linking the two adjacent groups together, which ring structure is substituted or unsubstituted. In such case, the fused ring structure can include at least one substituent comprising a substituted of unsubstituted diaryl ketone moiety represented by general formula (A).

Preferred substituents comprising a substituted or unsubstituted diaryl ketone moiety represented by general formula (A) comprise substituted or unsubstituted benzophenone moieties.

In certain embodiments, the at least one of Ra, Rb, and $R^1$-R8 comprising a substituted or unsubstituted diaryl ketone moiety represented by general formula (A) is the substituted or unsubstituted diaryl ketone moiety represented by general formula (A).

In certain embodiments, the at least one of Ra, Rb, and $R^1$-R8 comprising a substituted or unsubstituted diaryl ketone moiety represented by general formula (A) is a substituted or unsubstituted benzophenone moiety.

The photohardenable composition can optionally further include a coinitiator.

The photohardenable composition can optionally further include a sensitizer.

The photohardenable composition can optionally further include a synergist.

Optionally, the photohardenable composition can include a combination including one or more coinitiators, one or more sensitizers, and/or one or more synergists.

Preferably the photohardenable composition displays non-Newtonian rheological behavior.

In accordance with another aspect of the present invention there is provided a photohardenable composition comprising a photohardenable component and a photoswitchable photoinitiator, wherein the photoswitchable photoinitiator is activatable by exposure to light having a first wavelength and light having a second wavelength to induce a crosslinking or polymerization reaction in the photohardenable component, wherein the first and second wavelengths are different, and wherein photoswitchable photoinitiator comprising a naphthopyran molecule represented by general formula (II):

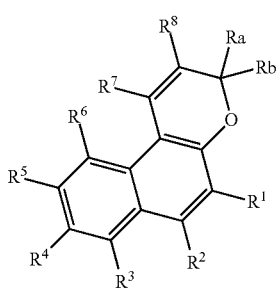

(II)

wherein Ra, Rb, and $R^1$-$R^8$ are the same or different and represent hydrogen, deuterium, a substituted or unsubstituted alkyl group, a substituted or unsubstituted alkenyl group, a substituted or unsubstituted cycloalkenyl group, a substituted or unsubstituted cycloalkyl group, a substituted or unsubstituted aryl group, a substituted or unsubstituted aralkyl group, a substituted or unsubstituted alkylaryl group, a substituted or unsubstituted heteroaryl group, a substituted or unsubstituted aryloxy group, a substituted or unsubstituted alkoxy group, a substituted or unsubstituted ester group, a substituted or unsubstituted carbonate group, a substituted or unsubstituted ketone group, a substituted or unsubstituted aldehyde group, a substituted or unsubstituted imine group, a substituted or unsubstituted carboxyl group, a substituted or unsubstituted amido group, a substituted or unsubstituted urethane group, a substituted or unsubstituted urea group, a substituted or unsubstituted tetrazine group, a substituted or unsubstituted amino group, iodo, bromo, chloro, fluoro, a cyano group, a nitro group, a hydroxyl group, a thiol, an alkyl thioether, an aryl thioether, or a substituted or unsubstituted alcohol group; and wherein any two adjacent $R^1$ to $R^8$ groups represent the atoms necessary to complete a fused ring structure linking the two adjacent groups together, which ring structure includes at least one substituent comprising a substituted or unsubstituted diaryl ketone moiety represented by general formula (A):

(A)

wherein Z and Z' are the same or different and are independently a substituted or unsubstituted aryl group or a substituted or unsubstituted heteroaryl group.

Preferably Ra and Rb are the same or different and can comprise a substituted or unsubstituted aryl C6-C20 group or a substituted or unsubstituted C4-C19 heteroaryl group. Examples of preferred substituted or unsubstituted aryl groups include, but are not limited to, comprises a substituted or unsubstituted phenyl or naphthyl group.

Preferred substituents comprising a substituted or unsubstituted diaryl ketone moiety represented by general formula (A) comprise substituted or unsubstituted benzophenone moieties.

In certain embodiments, the at least one substituent comprising a substituted or unsubstituted diaryl ketone moiety represented by general formula (A) is the substituted or unsubstituted diaryl ketone moiety represented by general formula (A).

In certain embodiments, the at least one substituent comprising a substituted or unsubstituted diaryl ketone moiety represented by general formula (A) is a substituted or unsubstituted benzophenone moiety.

The photohardenable composition can optionally further include a coinitiator.

The photohardenable composition can optionally further include a sensitizer.

Optionally, the photohardenable composition can include a combination including one or more coinitiators and/or one or more sensitizers.

Preferably the photohardenable composition displays non-Newtonian rheological behavior.

Several considerations in selecting a particular photoswitchable photoinitiator for inclusion in a photohardenable composition or method in accordance with the present invention include, by way of example, but not limited to, the absorption spectra and $\Delta_{max}$ of the molecule and its second forms, the solubility of the photoswitchable photoinitiator in the photohardenable component, the photosensitivity of the second form of the photoswitchable photoinitiator, the amount of initial concentration of the second form in the monomer solution, the stability of the photoswitchable photoinitiator and the reduction and oxidation potentials of the second form of the photoswitchable photoinitiator.

Photoswitchable photoinitiators and photohardenable compositions in accordance with the present invention are particularly suitable for use in the methods of the present invention for forming three-dimensional objects because the photoswitchable photoinitiator molecule and its second form (the active) has sufficiently distinct absorption spectra that once the closed form of the molecule is converted to the open form, the open form absorbs in a wavelength region where the closed form is substantially non-absorbing. In this way, the open form can be independently excited with the second wavelength without causing unintended excitation of the closed form by the second wavelength. The second wavelength can excite the open form to generate free radicals or otherwise induce desired hardening of the photohardenable component once the open form has been generated by exposure to the first wavelength.

A photohardenable component suitable for use in the photohardenable composition includes any resin (e.g., a monomer, an oligomer, a pre-polymer, a polymer, or a mixture including at least one the foregoing) that is photohardenable by exposure to light in the presence of a photoinitiator. Examples of photohardenable components useful for inclusion in a photohardenable composition in accordance with the present invention include ethylenically unsaturated compounds and, more specifically, a polyethylenically unsaturated compounds. These compounds include both monomers having one or more ethylenically unsaturated groups, such as vinyl or allyl groups, and polymers having terminal or pendant ethylenic unsaturation. Such compounds are well known in the art and include acrylic and methacrylic esters of polyhydric alcohols such as trimethylolpropane, pentaerythritol, and the like; and acrylate or methacrylate terminated epoxy resins, acrylate or methacrylate terminated polyesters, etc. Representative examples include, but are not limited to, ethylene glycol diacrylate, ethylene glycol dimethacrylate, trimethylolpropane triacrylate (TMPTA), pentaerythritol tetraacrylate, pentaerythritol tetramethacrylate, dipentaerythritol hydroxypentacrylate (DPHPA), hexanediol-1,6-dimethacrylate, and diethyleneglycol dimethacrylate. Preferred examples include, but are not limited to, a urethane acrylate or a urethane methacrylate.

Preferably, the photohardenable component included in the photohardenable composition is selected to achieve an optically transparent or clear liquid, which is desirable in processes and systems in which light, e.g., excitation light, is directed into the composition.

As provided herein, a photohardenable compositions in accordance with the present invention can optionally include one or more coinitiators.

Suitable coinitiators include coinitiators which are reducing agents or hydrogen donating compounds.

Examples of coinitiators that may be useful can be selected from among those known in the art, including but not limited to amines, thiols, thioethers, silanes, onium salts, and, more particularly, tertiary amines and organoborate salts. Iodonium salts may also be useful, particularly in combination with a borate salt. In certain embodiments, an iodonium salt may also be included in combination with a tertiary amine. Examples of other useful electron donating coinitiators are discussed by Eaton, D. F., "Dye Sensitized Photopolymerization", Advances in Photochemistry, Vol. 13, pp 427-486.

Representative examples of N,N-dialkylanilines useful in the present invention as coinitiators include 4-cyano-N,N-dimethylaniline, 4-acetyl-N,N-dimethylaniline, 4-bromo-N,N-dimethylaniline, 4-methyl-N,N-dimethylaniline, 4-ethoxy-N,N-dimethylaniline, N,N-dimethylthioanicidine, 4-amino-N,N-dimethylaniline, 3-hydroxy-N,N-dimethylaniline, N,N,N,'N,-tetramethyl-1,4-dianiline, 4-acetamido-N,N-dimethylaniline, 2,6-diethyl-N,N-dimethylaniline, N,N,2,4,6-pentanethylaniline (PMA) and p-t-butyl-N,N-dimethylaniline.

Certain other tertiary amines are also useful coinitiators including triethylamine, triethanolamine, N-methyldiethanolamine, 2-ethyl-4-(dimethylamino)benzoate, 2-ethylhexyl-4-(dimethylamino)benzoate, etc.

Another class of useful coinitiators are alkyl borate salts such as ammonium salts of borate anions of the formula $BR^aR^bR^cR^d$ wherein $R^a$-$R^d$ are independently selected from the group consisting of alkyl, aryl, alkaryl, allyl, aralkyl, alkenyl, alkynyl, alicyclic and saturated or unsaturated heterocyclic groups. Representative examples of alkyl groups represented by $R^a$-$R^d$ are methyl, ethyl, propyl, butyl, pentyl, hexyl, octyl, stearyl, etc. The alkyl groups may be substituted, for example, by one or more halogen, cyano, acyloxy, acyl, alkoxy or hydroxy groups. Representative examples of aryl groups represented by $R^a$-$R^d$ include phenyl, naphthyl and substituted aryl groups such as anisyl and alkaryl such as methylphenyl, dimethylphenyl, etc. Representative examples of aryl groups represented by $R^a$-$R^d$ include benzyl. Representative alicyclic groups include cyclobutyl, cyclopentyl, and cyclohexyl groups. Examples of an alkynyl group aryl propynyl and ethynyl, and examples of alkenyl groups include a vinyl group. Preferably, at least one but not more than three of $R^a$, $R^b$, $R^c$, and Rd is an alkyl group. Each of $R^a$, $R^b$, $R^c$, and $R^d$ can contain up to 20 carbon atoms, and they typically contain 1 to 7 carbon atoms. More preferably $R^a$-$R^d$ are a combination of alkyl group(s) and aryl-group(s) or aralkyl group(s) and still more preferably a combination of three aryl groups and one alkyl group, i.e., an alkyltriphenylborate, e.g., but not limited to, a butyltriphenyl borate.

Optionally, one or more sensitizers can be included in a photohardenable composition of the present invention. A sensitizer can create the excited state of the photoswitchable photoinitiator via absorbing light and transferring energy to the photoswitchable photoinitiator. For example, a sensitizer can control the sensitivity of the composition and to extend the spectral sensitivity of the closed form of the photoswitchable photoinitiator. Useful sensitizers include those known in the art such as acetophenone, benzophenone, 2-acetonaphthone, isopropyl thioxanthone, alkoxyketocoumarins, Esacure 3644, etc.

Photohardenable compositions and methods in accordance with the present invention preferably include a photohardenable composition that displays non-Newtonian rheological behavior advantageously where this rheological behavior can facilitate forming an object in a volume of a photohardenable composition described herein upon exposure to at least two different wavelengths of excitation light wherein the object remains at a fixed position or is minimally displaced in the volume of the unhardened photohardenable composition during formation. Minimal displacement refers to displacement of the object being formed during its formation in the volume that is acceptable for precisely producing the intended part geometry.

Photohardenable compositions and methods in accordance with the present invention preferably include a photohardenable composition that displays non-Newtonian rheological behavior that advantageously can also facilitate separation of the formed object from the unhardened photohardenable composition upon application of stress. While not wishing to be bound by theory, upon the application of stress, the apparent viscosity of the non-Newtonian photohardenable composition can drop to a lower value (e.g., the steady shear viscosity) than the static value (e.g., zero shear viscosity or yield stress) allowing the unhardened photohardenable composition to more easily flow off and separate from the object. Examples of such non-Newtonian rheological behavior include but are not limited to pseudoplastic fluid, yield pseudoplastic, Bingham pseudoplastic, and Bingham plastic.

Non-Newtonian rheological behavior can be imparted to the photohardenable composition by further including one or more reactive components (e.g. urethane acrylate oligomers, urethane methacrylate oligomers, acrylated or methacrylated polyurethanes, acrylated or methacrylated polyurethane-ureas, acrylated or methacrylated polyesters, acrylated or methacrylated polyamides, acrylate- or methacrylate-functional block copolymers, alkenyl- or alkynyl-functional urethane oligomers, alkenyl- or alkynyl-functional polyurethanes, alkenyl- or alkynyl-functional polyurethane-ureas, alkenyl- or alkynyl-functional polyesters, alkenyl- or alkynyl-functional polyamides, alkenyl- or alkynyl-functional block copolymers, thiol-functional urethane oligomers, thiol-functional polyurethanes, thiol-functional polyurethane-ureas, thiol-functional polyesters, thiol-functional polyamides, thiol-functional block copolymers) in the photohardenable component and/or by further adding one or more nonreactive additives (e.g., but not limited to, one or more thixotropes and/or rheology modifiers) to the photohardenable composition. Selection of the one or more of reactive components and the amounts thereof for addition to the photohardenable component to impart non-Newtonian rheological behavior thereto is within the skill of the skilled artisan in the relevant art without undue experimentation. Similarly, selection of nonreactive additives and the amount(s) thereof for addition to the photohardenable composition to impart non-Newtonian rheological behavior thereto is within the skill of the skilled artisan of the relevant art without undue experimentation.

For photohardenable compositions in accordance with the present invention, preferred steady shear viscosities are less than 30,000 centipoise, more preferably less than 10,000 centipoise, and most preferably less than 1,000 centipoise. (Steady shear viscosity refers to the plateau value of the viscosity achieved with unidirectional constant shear, e.g., the value of the viscosity after the thixotrope network has broken up.) Steady shear viscosities may be measured at ambient (e.g., room temperature), printing temperature, or some other temperature (e.g., elevated or reduced). Measurement at printing temperature may provide advantage in determining the suitability of photohardenable composition for printing.

Fillers

Optionally, photohardenable compositions in accordance with the present invention can further include one or more fillers. Fillers can be included in an amount greater than 0 to about 90 weight percent, the amount being determined by the purpose for the filler and the desired end use characteristics for the intended three-dimensional object.

Fillers may be used to modify the properties of the hardened photohardenable composition, for example the stiffness, strength, toughness, impact resistance, resistance to creep, resistance to fatigue, mechanical energy return, mechanical loss tangent, glass transition temperature, thermal degradation temperature, thermal conductivity, thermal resistance, moisture uptake, electrical conductivity, static dissipation, dielectric constant and loss tangent, density, refractive index, optical dispersion, opacity to ionizing radiation, and resistance to ionizing radiation. Fillers may also be used to modify the properties of the liquid photohardenable composition, such as rheological properties such as viscosity and thixotropy and optical properties such as refractive index. Examples of fillers include but are not limited to silica, alumina, zirconia; silicates glasses such as soda-lime glass, borosilicate glass, sodium silicate glass, lead glass, aluminosilicate glass, barium glass, thorium glass, glass ceramics; chalcogenide glasses; glass microspheres and microbubbles; nanoclays such as laponite, montmorillonite, bentonite, kaolinite, hectorite, and halloysite; calcium phosphate minerals such as hydroxyapatite, mineral fillers such as chalk, rock dust, slag dust, fly ash, hydraulic cement, loess, limestone, kaolin, talc, and wollastonite. Examples of particle size ranges include but are not limited to less than 10 microns, less than 1 micron, 10 nm to 500 nm, 10 nm to 90 nm, 40 nm to 70 nm. Smaller particles sizes, in particular sizes less than about 100 nm, may be beneficial to provide high optical clarity of the liquid composition to better facilitate printing. Controlling the particle size distribution, for example monodisperse, bimodal, or trimodal distributions of sizes, may be beneficial to control rheological properties, increase filler weight percent, or modify the properties of the photohardenable composition.

Other Additives

As mentioned above, photohardenable compositions in accordance with the present invention can further include one or more additives. Examples of additives include, but are not limited to, a thixotrope/rheology modifier, a defoamer, a stabilizer, an oxygen scavenger, and a nonreactive solvent diluent. Any additive can be a single additive or a mixture of additives. For example, a thixotrope can comprise a single thixotrope or a mixture of two or more thixotropes.

Additives are preferably selected so that they do not react with the hardenable resin component, upconverting component, photoinitiator, thixotrope, or any other additives that may be included in photohardenable compositions.

Thixotrope/Rheology Modifier

Thixotropes and rheology modifiers suitable for inclusion in a photohardenable composition described herein include, for example and without limitation, urea derivatives; modified urea compounds such as Rheobyk 410 and Rheobyk-D 410 available from BYK-Chemie GmbH, part of the ALTANA Group; fumed metal oxides (also referred to as pyrogenic metal oxides) including for example, but not limited to, fumed silica, fumed alumina; zirconia; precipitated metal oxides including for example, but not limited to, precipitated silica, precipitated alumina; unmodified and organo-modified phyllosilicate clays; dimer and trimer fatty acids; polyether phosphates; oxidized polyolefins; hybrid oxidized polyolefins with polyamide; alkali soluble/swellable emulsions; cellulosic ethers; hydrophobically-modified alkali soluble emulsions; hydrophobically-modified ethylene oxide-based urethane; sucrose benzoate; ester terminated polyamides; tertiary amide terminated polyamides; polyalkyleneoxy terminated polyamides; polyether amides; acrylamidomethyl-substituted cellulose ester polymers; polyethyleneimine; polyurea; organoclays; hydrogenated castor oil; organic base salts of a clay mineral (e.g., montmorillonite) and other silicate-type materials; aluminum, calcium, and zinc salts of fatty acids, such as lauric or stearic acid.

See U.S. Pat. No. 6,548,593 of Merz, et al., issued Apr. 15, 2003, and U.S. Pat. No. 9,376,602 of Walther, et al. issued Jun. 28, 2016, which are hereby incorporated herein by reference in their entireties, for information relating to urea derivatives that may be useful as thixotropes.

Thermally reversible gellants such as ester terminated polyamides, tertiary amide terminated polyamides, polyalkyleneoxy terminated polyamides, and polyether amides, and combinations thereof, may be desirable for us as thixotropes. Examples include Crystasense LP1, Crystasense LP2, Crystasense LP3, Crystasense MP, Crystasense HP4, Crystasense HP5, Rheoptima X17, Rheoptima X24, Rheoptima X38, Rheoptima X58, Rheoptima X73, and Rheoptima X84 available from Croda. Crystasense HP-5 is a preferred example of a thixotrope.

Metal oxides that have been surface-treated to impart dispersibility characteristics compatible with the hardenable resin component may be desirable for use as thixotropes.

A thixotrope can be included in a photohardenable composition described herein in an amount in a range from about 0.5 weight percent to about 15 weight percent of the photohardenable composition.

A thixotrope is preferably included in a photohardenable composition in an amount effective to at least partially restrict movement of the three-dimensional object or one or more regions thereof in the photohardenable composition during formation.

More preferably, the thixotrope is included in the photohardenable composition in an amount effective to at least partially restrict movement of the three-dimensional object suspended (without contact with a container surface) in the volume of the photohardenable composition during formation. Most preferably the position of the object in the volume of the photohardenable composition remains fixed position during formation of the object.

Defoamer

A defoamer can be included to aid in removing bubbles introduced during processing and handling. A preferred defoamer is BYK 1798 (a silicone based defoamer) available from BYK-Chemie GmbH, part of the ALTANA Group.

Stabilizer

A stabilizer can be included to improve shelf-life of the photohardenable composition and/or to control the level of cure and/or spatial resolution during printing. An example of preferred stabilizer is TEMPO (2,2,6,6-tetramethylpiperidinooxy free radical available from Sigma-Aldrich). Examples of other stabilizers include, but are not limited to, hindered phenols such as butylated hydroxytoluene; hydroquinone and its derivatives such as hydroquinone methyl ether; hindered amine light stabilizers; alkylated diphenylamines; and phosphite esters.

Oxygen Scavenger

An oxygen scavenger can be included to react with oxygen (e.g., singlet oxygen, dissolved oxygen) present in the photohardenable composition.

Non-Reactive Solvent

A non-reactive solvent diluent can be included. Examples include, but are not limited to, acetone, amyl acetate, n-butanol, sec-butanol, tert-butanol, butyl acetate, cyclohexanone, decane, dimethylacetamide, dimethylformamide, dimethylsulfoxide, dipropylene glycol, dipropylene glycol methyl ether, ethanol, ethyl acetate, ethylene glycol, glycerol, heptane, isopropanol, isopropyl acetate, methyl ethyl ketone, N-methyl pyrrolidone, propylene carbonate, propylene glycol, propylene glycol diacetate, tetrahydrofuran, tripropylene glygol methyl ether, toluene, water, xylenes.

Thermally Activated Radical Initiator

It may also be desirable to include a thermally activated radical initiator in a photohardenable composition. Thermally activated radical initiator examples include but are not limited to 2,2'-azobis(2-methylpropionitrile), 1,1'-azobis(cyclohexanecarbonitrile), 2,2'-azobis[N-(2-carboxyethyl)-2-methylpropionamidine] n-hydrate, 2,2'-azobis[2-methyl-N-(2-hydroxyethyl)propionamide], organic peroxides, inorganic peroxides, peroxydisulfate salts.

The nature of the monomer, the amount of the photoswitchable photoinitiator and, when applicable, a coinitiator and/or a sensitizer, in photohardenable compositions in accordance with the present invention will vary with the particular use of the compositions, the emission characteristics of the exposure sources, the development procedures, the physical properties desired in the polymerized product and other factors.

Examples of photohardenable compositions in accordance with certain aspects of the invention including one or more coinitiators and/or sensitizers will generally have compositions which fall within the following compositional ranges in parts by weight [based on 100 parts total]:

Photohardenable component 10 to 99.9999 photoswitchable photoinitiator 0.0001 to about 0.5

Coinitiators 0.001 to about 10

Sensitizer (optional) 0.1 to 1.

Examples of photohardenable compositions in accordance with certain aspects the invention not including one or more coinitiators and/or sensitizers will generally have compositions which fall within the following compositional ranges in parts by weight [based on 100 parts total]:

Photohardenable component 10 to about 99.9999 photoswitchable photoinitiator 0.0001 to about 0.5.

In accordance with still another aspect of the present invention, there is provided a method of forming or printing an object comprising: (a) providing a volume including a photohardenable composition in accordance with the present invention; (b) simultaneously or sequentially irradiating one or more selected locations within the volume of the photohardenable composition with light having a first wavelength and light having a second wavelength, wherein light having the first wavelength and light having the second wavelength activate the photoswitchable photoinitiator at the one or more selected locations to at least partially form the object, wherein the object at least partially formed in the photohardenable composition remains at a fixed position or is minimally displayed in the unhardened photohardenable composition during formation; and (c) optionally repeating step b, irradiating the photohardenable composition at one or more of the same or different locations in the volume until the object is partially or fully formed.

Preferably the volume of the photohardenable liquid is included within a container wherein at least one or more portions of the container are optically transparent so that the photohardenable composition is accessible by light used to irradiate the photohardenable composition. It can be desirable for the optically transparent portions of the container to also be optically flat.

Examples of power densities for the first wavelength light include power densities in a range from about 0.01 W/cm$^2$ to about 100,000 W/cm$^2$ (inclusive). Examples of power densities for the second wavelength light include power densities in a range from about 0.01 W/cm$^2$ to about 100,000 W/cm$^2$ (inclusive).

Examples of exposure energies for the first wavelength light include exposure energies in a range from about 0.001 mJ/cm$^2$ to about 1,000 mJ/cm$^2$ (inclusive). Examples of exposure energies for the second wavelength light include exposure energies in a range from about 0.01 mJ/cm$^2$ to about 100,000 mJ/cm$^2$ (inclusive).

Methods in accordance with certain aspects of the present invention including a photohardenable composition that demonstrate non-Newtonian rheological behavior can facilitate forming an object, preferably a three-dimensional object, that is fully suspended in the volume of the photohardenable composition during formation. The ability to have the object fully suspended in the volume during formation advantageously eliminates the need to include support structures of the type used in stereolithography to maintain the geometry/shape of the object during formation (which is sometimes referred to as printing or 3D printing).

For use in forming objects, e.g., three-dimensional objects, it is desired that photohardenable compositions do not harden (e.g., the photohardenable component does not undergo polymerization or cross-linking) upon exposure of the photohardenable composition to only the first wavelength or only the second wavelength. In other words, hardening of the photohardenable composition in the volume which is not simultaneously or nearly simultaneously (e.g., due to the closely timed sequential exposure) exposed to both radiations do not polymerize. In particular, in scanning a volume of the photohardenable media, as a result of beams passing through previously exposed areas or planes, there will be numerous points in the volume which are sequentially scanned in any order with the first wavelength radiation and the second wavelength radiation as the structure of the object is defined in the volume of the medium by the intersection of the beams. Some points may also experience multiple exposures to the first wavelength light and/or second wavelength light. It is desirable to select photoswitchable photoinitiators which reverse when they are not being exposed to first wavelength light.

Preferably the photohardenable composition displays non-Newtonian rheological behavior.

Examples of photoswitchable photoinitiators described herein that may be included in photohardenable compositions and methods in accordance with the present invention include, but are not limited to, photoswitchable photoinitiators represented by following formulae (IV)-(VI):

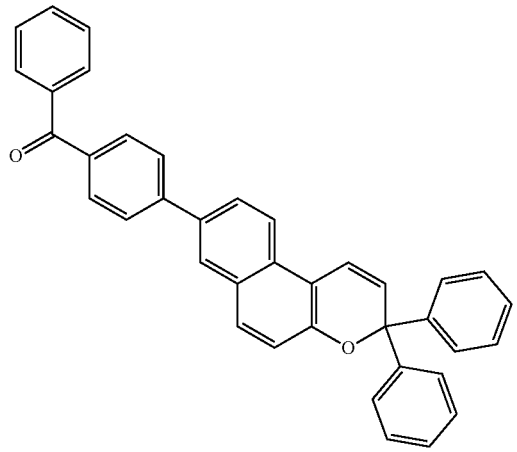

(IV)

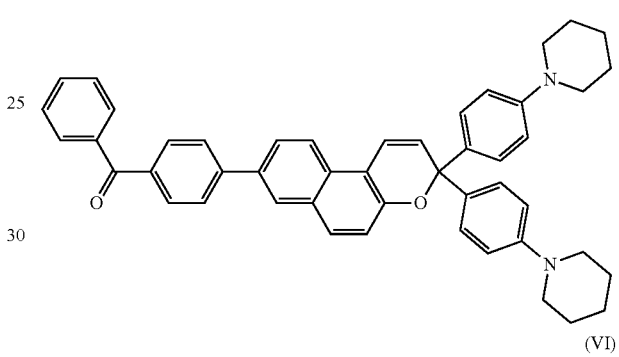

(V)

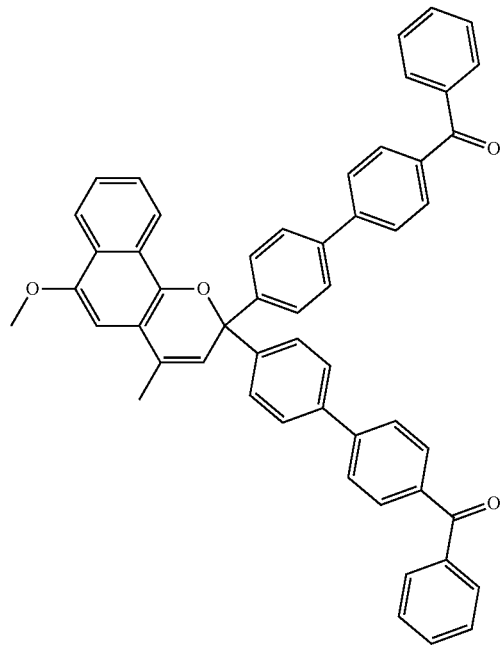

(VI)

Preferably the amount of time during which one or more selected locations within the volume are simultaneously or sequentially exposed to the first wavelength light and the second wavelength light is sufficient to induce hardening of the photohardenable composition at the one or more selected locations and is insufficient to cause hardening of the photohardenable composition when only one of the first and second wavelengths is present.

Preferably light of the first and light of the second wavelengths are projected into the volume as separate optical projections. More preferably the projection of light of the first wavelength is orthogonal to the projection of the light of the second wavelength.

Preferably the projection of light of the first wavelength comprises a light sheet.

The methods of the invention described herein can further include post-processing. Examples of post-processing steps that may be further included in a method in accordance with the invention include, but are not limited to, one or more of the following: washing, post-curing (e.g., by light, heat, ionizing radiation, humidity, pressure, or simultaneous or sequential combinations of techniques), metrology, freeze-dry processing, critical point drying, and packaging.

In accordance with the preferred embodiments of the invention for forming a three-dimensional object, it is desirable to select a photoswitchable photoinitiator molecule for which the wavelength of first excitation has significant absorption for the first form, and where the second form of the photoinitiator has minimal absorption of the first excitation wavelength. This has two advantages, first, it simplifies exposure in that activation of the photoswitchable photoinitiator can occur without activating the second form thereof to induce a crosslinking or polymerization reaction in the photohardenable component. When there is substantial overlap, the intensity of the two radiations must be carefully controlled so as to activate the photoswitchable photoinitiator molecule while minimally activating the second form thereof. Second, it can permit deeper penetration of the volume or layer of the composition as the conversion of the photoswitchable photoinitiator to the second form thereof has the effect of "bleaching" the photoswitchable photoinitiator molecule or making it transparent with respect to the first wavelength radiation.

Preparation of photohardenable compositions in accordance with the invention is conducted in an otherwise known or conventional manner, e.g., a solvent for the monomer may be used to remove the photohardenable composition in the unexposed areas. The monomers used herein most typically are known in the art as are their solvents.

Generally, photoswitchable photoinitiators useful in photohardenable compositions in accordance with the invention can absorb at about 300 nm to 550 nm. Other examples of ranges in which the photoswitchable photoinitiator will absorb light include, but are not limited to, from about 350 nm to about 410 nm (inclusive), about 375 nm±10 nm, and about 405 nm±10 nm. Depending upon the extinction coefficient for the particular photoswitchable photoinitiator, the conversion to the second form can be induced by exposure to any source which emits in this range, e.g., lasers, light emitting diodes, mercury lamps. Filters may be used to limit the output wavelengths. A non-limiting example of filtered light includes filtered emission from a mercury arc lamp, etc.

The second form of the photoswitchable photoinitiator will preferably absorb in a range of about 450 nm to 1000 nm and 450 nm to 850 most typically. Other examples of ranges in which the second form of the photoswitchable photoinitiator will preferably absorb include 450 nm to about 700 nm (inclusive). This form can be activated by the second excitation light to produce free radicals directly or to produce excitons which undergo electron transfer or hydrogen abstraction (optionally via electron, hydrogen, or energy transfer with coinitiator(s) in aspects of the invention including one or more coinitiator) by exposure to any second wavelength within this range. For the second excitation, exposures may be accomplished using a laser source, an LED or LED array, the filtered emission from an arc lamp, or other suitable source with emission within the desired wavelength range. argon ion, He—Ne, laser diodes, krypton, frequency-multiplied Nd-YAG etc. Other light sources may be used, optionally with filters to limit output wavelengths, e.g., light emitting diodes, incandescent lamps, halogen lamps, mercury lamps, arc lamps, etc.

Other information that may be useful in connection with methods for forming three-dimensional objects include the x, y, z volumetric methods described in U.S. Pat. Nos. 4,041,476, 4,078,229, 4,238,840, 4,466,080, 4,471,470, and 4,333,165 to Swainson and in U.S. Pat. No. 5,230,986 to Neckers, and U.S. Pat. No. 4,575,330 to Hull. Such patents to Swainson disclose concepts relating to forming a three-dimensional figure in situ in a medium by causing two dissimilar radiation beams to intersect in the medium (In the described process, the X, Y, and Z axes are scanned within a volume of a photohardenable material). Such patent to Hull alternatively describes an x, y cross-sectional method.

Other information that may be useful in connection with the present invention in addition to the above-mentioned patents of Neckers, Swainson, and Hull includes International Patent Application No. PCT/US2021/035791 of Quadratic 3D, Inc. filed Jun. 3, 2021 for "Volumetric Three-Dimensional Printing Methods Including A Light Sheet And Systems" and U.S. Pat. No. 10,843,410 of Lippert, et al. for "System And Method For A Three-Dimensional Optical Switch Display (OSD) Device".

Each of the patents and other references cited herein are hereby incorporated herein by reference in its entirety.

EXAMPLES

The examples provided herein are provided as examples and not limitations, wherein a number of modifications of the exemplified compositions and processes are contemplated and within the scope of the present invention.

Example 1

Example of Procedure for Preparation of an Example of a Photoswitchable Photoinitiator Represented by Formula (III) (2-(4-benzoylphenyl)-3,3-diphenyl-3H-benzo[f]chromene)

2-benzoylphenyl-3,3-diphenyl-3H-benzo[f] chromene is Prepared via the Following Reaction

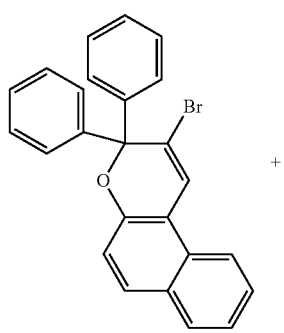

37

-continued

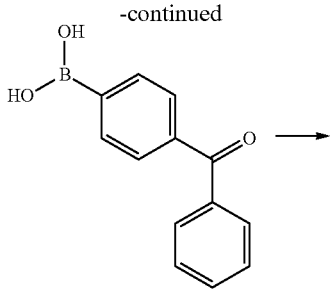

To a sealed tube equipped with a stir bar, under inert atmosphere, is added 400 milligrams of 2-bromo 3,3 diphenyl 3h benzo[f] chromene*, 280 milligrams of 4-benzoyl phenylboronic acid, 42 milligrams of bis(diphenylphosphino)ferrocene]dichloropalladium(II), 713 milligrams of potassium carbonate, 4.5 mL of tetrahydrofuran and 0.5 mL of water. The solution is stirred for 24 hours at 60 degrees Celsius, then extracted between dichloromethane and water. The organic phase is dried under vacuum and the solid is purified using hexanes and dichloromethane as eluent for column chromatography on neutral silica to yield a white solid product.

*Procedure for the Preparation of Starting Material 2-bromo-3,3-diphenyl-3H-benzo[f]-chromene for Use in Procedure for Preparing 2-(4-benzoylphenyl)-3,3-diphenyl-3H-benzo[f]chromene by the Above Example I Procedure To a round bottom flask with a stir bar is added 1 gram of 3,3-Diphenyl-3H-benzo[f]chromene, 60 mL of dimethylsulfoxide, and 0.39 mL of water. This solution is stirred and 1.38 grams of N-bromosuccinimide is added slowly over 15 minutes. After addition is finished, the solution is stirred another 10 minutes, then poured into water and extracted into ethyl acetate. The ethyl acetate is removed under vacuum to yield a crude solid, to which 20 mL of toluene and 75 milligrams of 4-toluenesulfonic acid monohydrate are added and the mixture is stirred for 2.5 hours at reflux. The mixture is then extracted into ethyl acetate, washed with water, and the organic phase isolated and solvent are removed under vacuum. This solid is purified on neutral silica using column chromatography, with 1:20 ethyl acetate:hexane as eluent to yield a white solid product. (This molecule demonstrates very short open form lifetime and curing with only UV exposure.)

38

Example 2

Example of Procedure for Preparation of an Example of a Photoswitchable Photoinitiator Represented by Formula (IV) (8-(4-benzoylphenyl)-3,3-diphenyl-3H-naphtho[2,1-b]pyran)

8-(4-benzoylphenyl)-3,3-diphenyl-3H-naphtho[2,1-b]pyran is Prepared via the Following Reaction

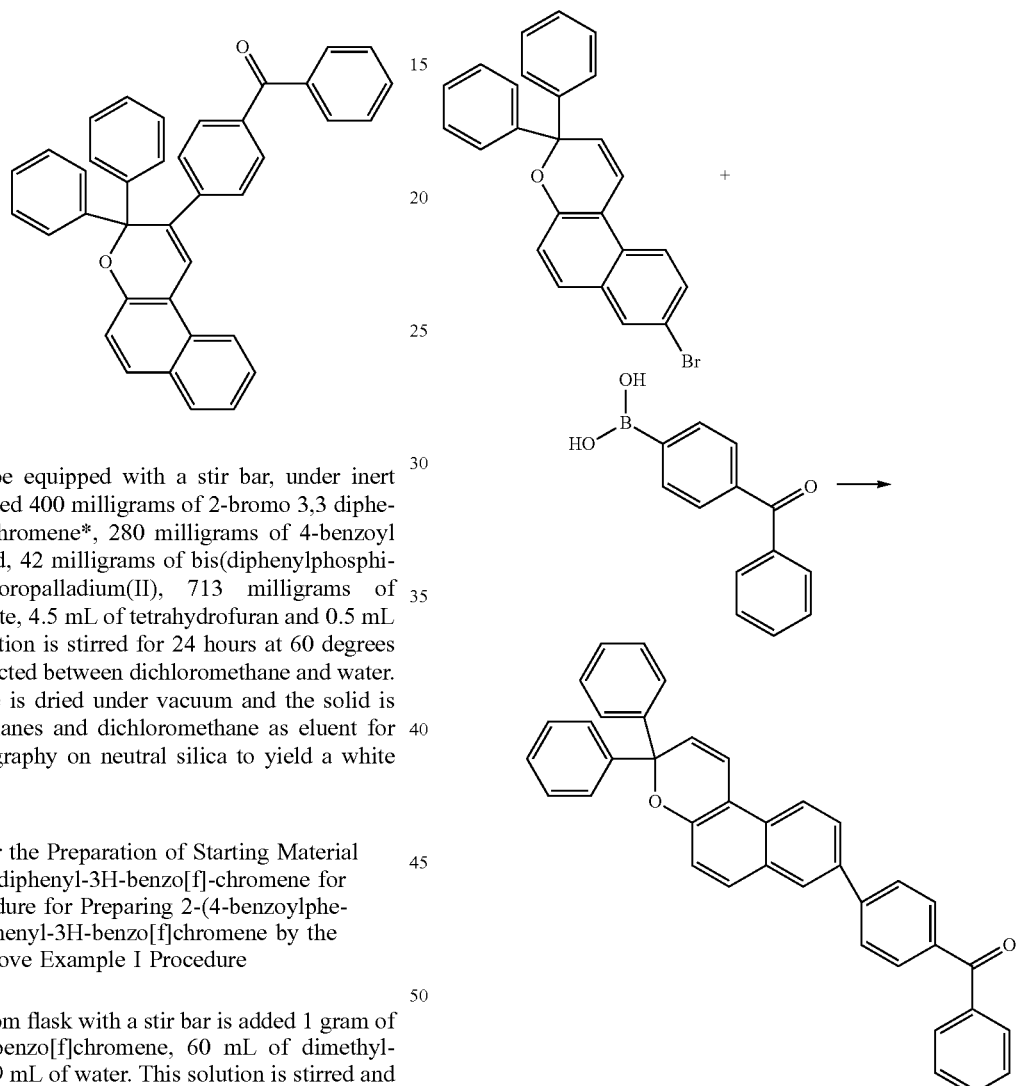

To a 40 mL sealed tube with a stir bar under nitrogen is added 1 gram of 8-bromo-3,3-diphenyl-3H-naphtho[2,1-b]pyran**, 0.66 grams of 4 benzoyl phenylboronic acid, 99 milligrams of [1,1'-bis(diphenylphosphino)ferrocene]dichloropalladium(II), 1.6 grams of potassium carbonate, 9 mL of tetrahydrofuran and 1 mL of water. The mixture is stirred for 24 hours at 60 degrees Celsius, then extracted between water and dichloromethane. The organic layer is isolated, and solvent is removed under vacuum to yield crude solid. This solid is purified by column chromatography using hexanes and dichloromethane to yield a white solid product.

Procedure for the Preparation of Starting Material 8-bromo-3,3-diphenyl-3H-naphtho[2,1-b]pyran for Use in Procedure for Preparing 8-(4-benzoylphenyl)-3,3-diphenyl-3H-naphtho[2,1-b]pyran by the Above Example 2 Procedure

8-bromo-3,3-diphenyl-3H-naphtho[2,1-b]pyran is Prepared via the Following Reaction

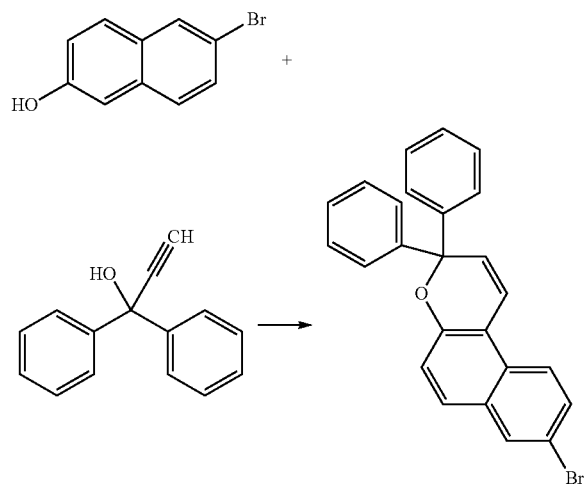

To a 40 mL sealed tube equipped with a stir bar is added under nitrogen 5 grams of 6-bromo-2-naphthol, 4.66 grams of 1,1, diphenprop-2-yn-1-ol, 0.28 grams of pyridinium p-toluenesulfonate, 4.75 grams of trimethyl orthoformate, and 30 mL of dichloroethane. The mixture is stirred at 85 degrees Celsius for 24 hours, then solvent is removed under vacuum and the resulting solid is purified by column chromatography on neutral silica using 2% ethyl acetate, 10% hexanes and 88% toluene as eluent to yield an off-white-light yellow crystal product.

Example 3

Example of Procedure for Preparation of an Example of a Photoswitchable Photoinitiator Represented by Formula (V)

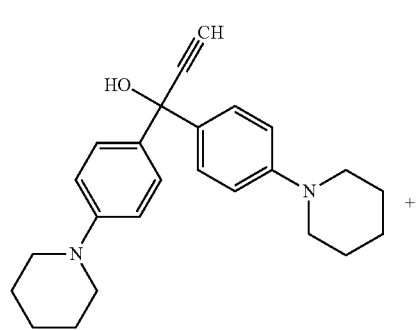

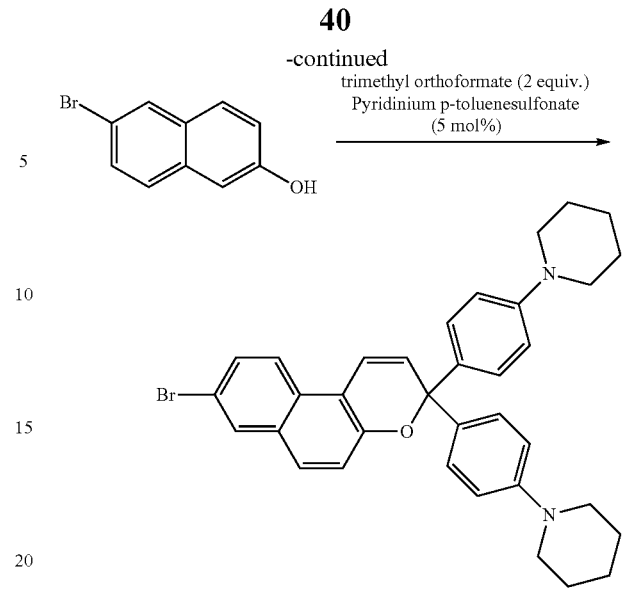

The alkynol shown above (2.5 grams) is added to 6-bromo-2-naphthol (1.49 grams) along with 1.41 grams of triethyl orthoformate (1.41 grams) and pyridinium-p-toluenesulfonate (0.084 grams) and 20 milliliters of dichloroethane. The mixture is stirred under nitrogen for 16 hours at 85 degrees Celsius, then extracted between water and dichloromethane. The organic phase is isolated and solvent removed under vacuum to yield a crude product. The crude product is purified on silica using 2% ethyl acetate, 10% hexanes and 88% toluene as eluent to yield pure product as a light blue/white solid.

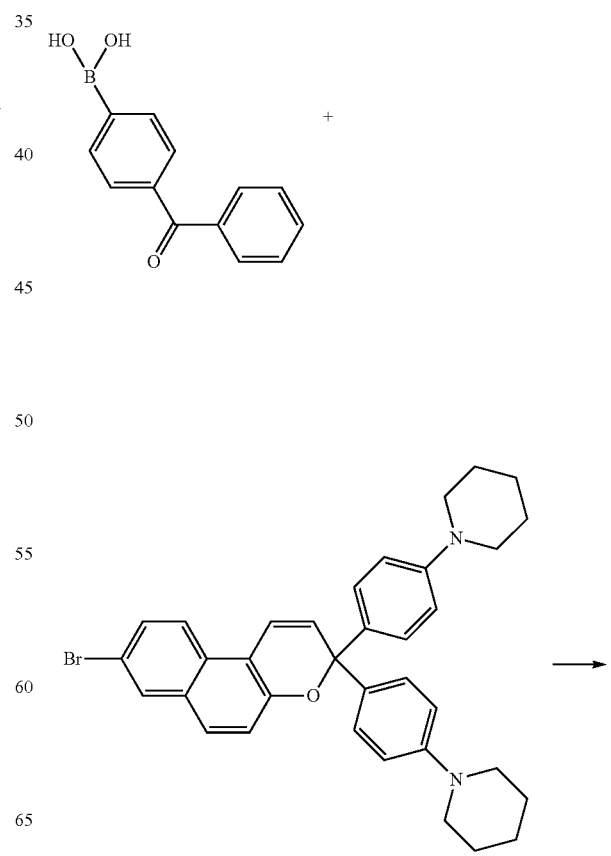

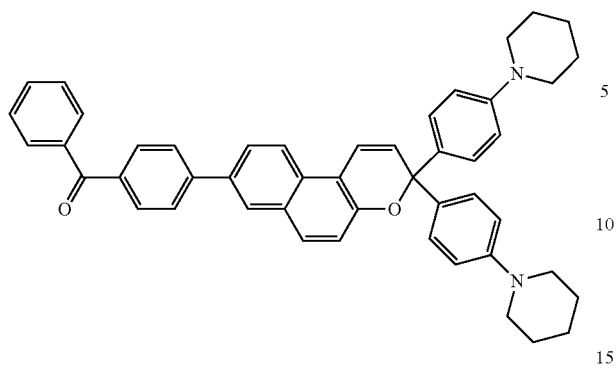

To a 20 mL sealed tube under nitrogen is added 580 milligrams of brominated naphthopyran, 701 milligrams of 4-benzoyl-phenylboronic acid, 37 milligrams of XPhos Palladium Generation 2, 660 milligrams of potassium phosphate, 4 milliliters of tetrahydrofuran and 1 milliliter of water. The mixture is stirred at 65 degrees Celsius overnight, then extracted between water and dichloromethane. The organic phase is isolated and solvent removed under vacuum to yield a crude product. The crude product is purified on silica using dichloromethane and hexanes as eluent to yield product as a blue solid.

Example 4

Example of Procedure for Preparation of an Example of a Photoswitchable Photoinitiator Represented by Formula (VII)

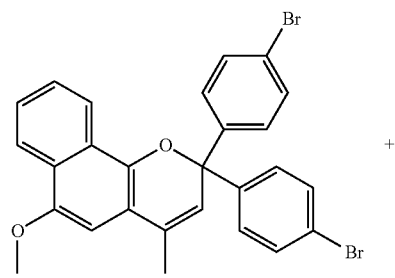

+

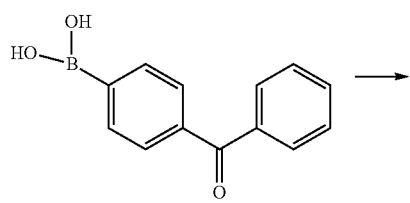

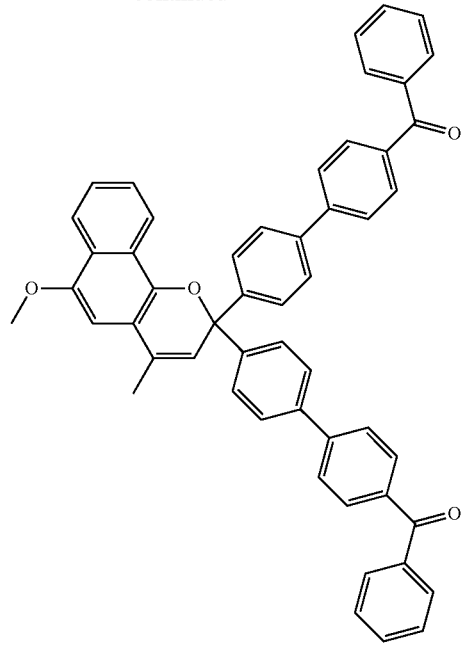

To a 20 mL sealed tube under nitrogen is added 50 milligrams of dibrominated naphthopyran, 46 milligrams of 4-benzoyl phenylboronic acid, 3.8 milligrams of palladium [1,1'-Bis(diphenylphosphino)ferrocene]dichloropalladium (II), 103 milligrams of potassium carbonate, 3 milliliters of 1,4-dioxane, and 1 milliliter of water. This mixture is stirred under inert atmosphere for 5 hours at 60 degrees Celsius. The mixture is cooled to room temperature, dichloromethane is added, and the resulting solution is passed over a pad of silica gel on top of celite. The organic phase is evaporated to dryness under vacuum, then purified using preparative thin layer chromatography using dichloromethane as eluent to yield the pure product as a white solid.

Example 5

Example of Procedure for Preparation of an Example of A Photohardenable Composition Including Photoswitchable Photoinitiator Represented by Formula (IV)

To a 40 mL glass scintillation vial, 0.48 g Crystasense HP-5 thixotrope (Croda) and 2.0 g N,N-dimethylacrylamide (99.5%, Sigma Aldrich) are added. The vial is sealed and placed in a 105° C. heating block for 10 min to melt the thixotrope. The vial is mixed in a speedmixer (model DAC 150.1 FVZ-K, Flacktek) for 1 min at 3100 rpm. 80 mg butyryl choline butyltriphenylborate (Borate V, Spectra Photopolymers) is weighed out and added to a plastic speedmixer jar (max-100, Flacktek). 2.0 g stock solution of photoswitchable photoinitiator (20.0 mg 8-(4-benzoylphenyl)-3,3-diphenyl-3H-naphtho[2,1-b]pyran dissolved in 20.0 g N,N-dimethylacrylamide) is added to the jar. The jar is swirled to dissolve the Borate V. The thixotrope solution is poured from the vial into the jar. 8.0 g PRO13443 (Arkema) is added to the jar by large plastic syringe. The jar is mixed for 1 min at 2000 rpm. 28.0 g GENOMER 4259 (Rahn) is added to the jar by a large plastic syringe. The jar is mixed for 1 min at 3100 rpm. The jar is placed in a 60 deg C. oven for 5-10 min. The jar is mixed for 1 min at 3100 rpm. The photohardenable composition is transferred by plastic syringe to cuvettes for printing. As necessary, the cuvettes are centrifuged to remove bubbles and cleaned with methanol to remove smudges.

Example 6

Example of Procedure for Printing a Single Disk

A cuvette of photohardenable composition (e.g., as described in Example 5) is simultaneously illuminated by a 375 nm laser light sheet of nominal 100 microns thickness and an operating power density of about 0.5 W/cm$^2$ and an orthogonal and intersecting gaussian beam of 532 nm laser light at a power density in a range from about 250 mW/cm$^2$ to about 5 W/cm$^2$ to form a disk of solid polymer matching the circular cross-section of the 532 nm laser beam and the thickness of the 375 nm light sheet at the intersection of the light sheet and beam.

Example 7

Prophetic Example of Procedure for Printing an Object

A cuvette of photohardenable composition (e.g., as described in Example 5) is placed in a plastic holder on a motorized stage. Red or green laser light (e.g., 638 nm or 532 nm CW diode laser, 10-40 W operating power) is used to illuminate a digital micromirror device (Texas Instruments) to form a pattern which is projected into the cuvette along the z axis to produce a pattern of approximately 1-10 W/cm$^2$ of red or green light, respectively. UV or violet light (e.g., 375 nm or 405 nm CW diode laser, 50-300 mW operating power) is used to form a light sheet that passes through the cuvette orthogonally to the projected pattern to illuminate a single x-y plane of nominal 100 microns thickness to produce an intensity of approximately 0.5-5 W/cm$^2$. The stage is advanced in increments of 1-100 microns at intervals of 50-5000 ms, with the UV or violet light forming a light sheet and the red or green light pattern changing at each advancement corresponding to computer generated slices of a three-dimensional object. In regions where there is simultaneous or nearly simultaneous exposure to both wavelengths of light, the photohardenable composition is hardened. In this manner, a three-dimensional solid object is formed without displacement (e.g., sinking or drifting) and without need for support structures or attachment to a build platform due to the high zero shear viscosity or yield stress of the non-Newtonian photohardenable composition.

Light sheets can be constructed by means known in the art including, for example, but not limited to, techniques including a laser and a Powell lens, galvanometer, and/or polygon scanning mirror. Alternatively, one or more LEDs can be used as a light source.

Optionally, a method described herein can further include use of a third wavelength to force the reverse reaction of the second form of the photoswitchable photoinitiator back to the original/starting form to help avoid hardening of unwanted areas.

As used herein first wavelength, second wavelength, and third wavelength can refer to a range of wavelengths.

Methods and systems useful with the photohardenable compositions and methods of the present invention include those described in U.S. Patent Application No. 63/231,182 of Quadratic 3D, Inc. filed Aug. 9, 2021 for "Methods And Systems For Forming An Object In A Volume Of A Photohardenable Composition" and International Application No. PCT/US2022/039766 of Quadratic 3D, Inc. filed Aug. 9, 2022 for "Methods And Systems For Forming An Object In A Volume Of A Photohardenable Composition", each of which is hereby incorporated herein by reference in its entirety.

In methods described herein, the first wavelength and second wavelength are preferably generated by different light sources or optical projection systems.

Examples of light sources and optical projection systems that can be used to produce the first wavelength and second wavelength include, by way of example, but are not limited to, those described in International Patent Application No. PCT/US2021/035791 of Quadratic 3D, Inc. filed Jun. 3, 2021 for "Volumetric Three-Dimensional Printing Methods Including A Light Sheet And Systems".

A method of the present invention preferably includes providing a volume of a photohardenable composition described herein that is included within a container wherein at least a portion of the container is optically transparent so that the photohardenable composition is accessible by excitation light. Optionally, the entire container is optically transparent.

Optically transparent portions of a container can be constructed from a material comprising, for example, but not limited to, glass, quartz, fluoropolymers (e.g., Teflon FEP, Teflon AF, Teflon PFA), cyclic olefin copolymers, polymethyl methacrylate (PMMA), polynorbornene, sapphire, or transparent ceramic.

Examples of container shapes include, but are not limited to, a cylindrical container having a circular or oval cross-section, a container having straight sides with a polygonal cross-section or a rectangular or square cross-section.

Preferably the optically transparent portion(s) of the container is (are) also optically flat.

Optionally, one or more filters are added to at least a surface of any optically transparent portions of the container to block undesired light, e.g., room light, to prevent unintentional curing.

Optionally, the photohardenable composition is degassed, purged or sparged with an inert gas before or after being introduced into the container. Optionally the photohardenable composition is maintained under inert conditions, e.g., under an inert atmosphere, during printing. This can prevent introduction of oxygen into the container while the object is being printed or formed.

In the methods described herein, the container may be rotated to provide additional angles of illumination or projection of excitation light into the volume of photohardenable composition contained therein. This can be of assistance in patterning object volumes or surfaces more accurately or it can be used as a means of providing multiple exposure of a given feature from different angles.

In the methods described herein, the container may be stationary while a beam or optical projection of excitation light is being directed into the photohardenable composition.

The methods disclosed herein can also include the use commercially available optical projection and filtering techniques or systems that employ two or more optical projection methods at once.

Before printing, a digital file of the object to be printed is obtained. If the digital file is not of a format that can be used to print the object, the digital file is then converted to a format that can be used to print the object. An example of a typical format that can be used for printing includes, but is not limited to, an STL file. Typically, the STL file is then sliced into two-dimensional layers with use of three-dimensional slicer software and converted into G-Code or a set of machine commands, which facilitates building the object. See B. Redwood, et al., "The 3D Printing Handbook—Technologies, designs applications", 3D HUBS B.V. 2018.

Examples of sources of the excitation light source for use in the methods described herein include laser diodes, such as those available commercially, light emitting diodes, DMD projection systems, micro-LED arrays, vertical cavity lasers (VCLs). In some embodiments, the excitation radiation source (e.g., the light source) is a light-emitting diode (LED).

The excitation light can be directed into the volume of photohardenable composition in a continuous or intermittent manner. Intermittent excitation can include random on and off application of light or periodic application of light. Examples of periodic application of light includes pulsing. Excitation can alternatively be applied as a combination of both continuous excitation light and intermittent light, including, for example, the application of intermittent excitation light that is preceded or followed by irradiation with continuous light.

Other information concerning optical systems that may useful in connection with the various aspects of the present inventions includes Texas Instruments Application Report DLPA022—July 2010 entitled "DLP™ System Optics"; Texas Instruments "TI DL$^R$ Technology for 3D Printing—Design scalable high-speed stereolithography [sic] systems using TI DLP technology" 2016; Texas Instruments "DLP6500 0.65 1018p MVSP Type A DMD", DLP6500, DLPS040A—October 2014—Revised October 2016; and Y-H Lee, et al., "Fabrication of Periodic 3D Nanostructuration for Optical Surfaces by Holographic Two-Photon-Polymerization", Int'l Journal of Information and Electronics Engineering, Vol 6, No. 3, May 2016, each of the foregoing being hereby incorporated herein by reference in its entirety.

As used herein, "optically transparent" refers to having high optical transmission to the wavelength of light being used, and "optically flat" refers to being non-distorting (e.g., optical wavefronts entering the portion of the container or build chamber remain largely unaffected).

As used herein, the singular forms "a", "an" and "the" include plural unless the context clearly dictates otherwise. Thus, for example, reference to a material includes reference to one or more of such materials.

Applicant specifically incorporates the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

The invention claimed is:

1. A photohardenable composition comprising a photohardenable component and a photoswitchable photoinitiator, wherein the photoswitchable photoinitiator is activatable by exposure to light having a first wavelength and light having a second wavelength to induce a crosslinking or polymerization reaction in the photohardenable component, wherein the first and second wavelengths are different, and wherein the photoswitchable photoinitiator comprises a naphthopyran molecule including one or more substituents wherein at least one substituent comprises a substituted or unsubstituted diaryl ketone moiety represented by general formula (A):

wherein Z and Z' are the same or different and are independently a substituted or unsubstituted aryl group or a substituted or unsubstituted heteroaryl group.

2. The photohardenable composition of claim 1 wherein the naphthopyran molecule is represented by general formula (I):

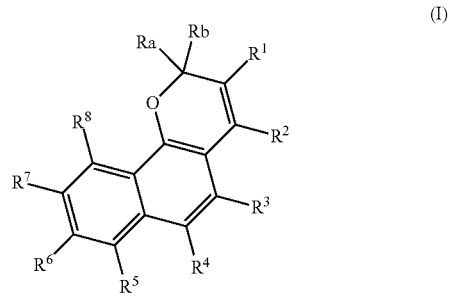

wherein Ra, Rb, and $R^1$-$R^8$ are the same or different and represent hydrogen, deuterium, a substituted or unsubstituted alkyl group, a substituted or unsubstituted alkenyl group, a substituted or unsubstituted cycloalkenyl group, a substituted or unsubstituted cycloalkyl group, a substituted or unsubstituted aryl group, a substituted or unsubstituted aralkyl group, a substituted or unsubstituted alkylaryl group, a substituted or unsubstituted heteroaryl group, a substituted or unsubstituted aryloxy group, a substituted or unsubstituted alkoxy group, a substituted or unsubstituted ester group, a substituted or unsubstituted carbonate group, a substituted or unsubstituted ketone group, a substituted or unsubstituted aldehyde group, a substituted or unsubstituted imine group, a substituted or unsubstituted carboxyl group, a substituted or unsubstituted amido group, a substituted or unsubstituted urethane group, a substituted or unsubstituted urea group, a substituted or unsubstituted tetrazine group, a substituted or unsubstituted amino group, iodo, bromo, chloro, fluoro, a cyano group, a nitro group, a hydroxyl group, a thiol, an alkyl thioether, an aryl thioether, or a substituted or unsubstituted alcohol group; and wherein at least one of Ra, Rb, and $R^1$-$R^8$ comprises a substituted or unsubstituted diaryl ketone moiety represented by general formula (A):

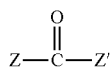

wherein Z and Z' are the same or different and are independently a substituted or unsubstituted aryl group or a substituted or unsubstituted heteroaryl group.

3. The photohardenable composition of claim 1 wherein the naphthopyran molecule is represented by general formula (II):

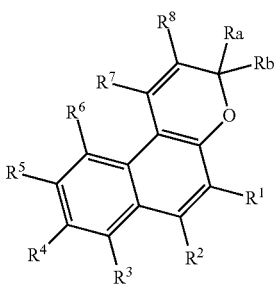

wherein Ra, Rb, and $R^1$-$R^8$ are the same or different and represent hydrogen, deuterium, a substituted or unsubstituted alkyl group, a substituted or unsubstituted alkenyl group, a substituted or unsubstituted cycloalkenyl group, a substituted or unsubstituted cycloalkyl group, a substituted or unsubstituted aryl group, a substituted or unsubstituted aralkyl group, a substituted or unsubstituted alkylaryl group, a substituted or unsubstituted heteroaryl group, a substituted or unsubstituted aryloxy group, a substituted or unsubstituted alkoxy group, a substituted or unsubstituted ester group, a substituted or unsubstituted carbonate group, a substituted or unsubstituted ketone group, a substituted or unsubstituted aldehyde group, a substituted or unsubstituted imine group, a substituted or unsubstituted carboxyl group, a substituted or unsubstituted amido group, a substituted or unsubstituted urethane group, a substituted or unsubstituted urea group, a substituted or unsubstituted tetrazine group, a substituted or unsubstituted amino group, iodo, bromo, chloro, fluoro, a cyano group, a nitro group, a hydroxyl group, a thiol, an alkyl thioether, an aryl thioether, or a substituted or unsubstituted alcohol group; and wherein at least one of Ra, Rb, and $R^1$-$R^8$ comprises a substituted or unsubstituted diaryl ketone moiety represented by general formula (A):

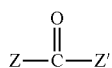

wherein Z and Z' are the same or different and are independently a substituted or unsubstituted aryl group or a substituted or unsubstituted heteroaryl group.

4. The photohardenable composition of claim 2 wherein any two adjacent $R^1$ to $R^8$ groups represent the atoms necessary to complete a fused ring structure linking the two adjacent groups together, which ring structure includes at least one substituent comprising a substituted or unsubstituted diaryl ketone moiety represented by general formula (A):

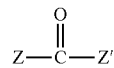

wherein Z and Z' are the same or different and are independently a substituted or unsubstituted aryl group or a substituted or unsubstituted heteroaryl group.

5. The photohardenable composition of claim 3 wherein any two adjacent $R^1$ to $R^8$ groups represent the atoms necessary to complete a fused ring structure linking the two adjacent groups together, which ring structure includes at least one substituent comprising a substituted or unsubstituted diaryl ketone moiety represented by general formula (A):

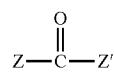

wherein Z and Z' are the same or different and are independently a substituted or unsubstituted aryl group or a substituted or unsubstituted heteroaryl group.

6. The photohardenable composition of claim 1 further comprising one or more coinitiators.

7. The photohardenable composition of claim 1 wherein the photohardenable composition displays non-Newtonian rheological behavior.

8. The photohardenable composition of claim 1 wherein the at least one substituent comprising a substituted or unsubstituted diaryl ketone moiety represented by general formula (A) comprises a substituted or unsubstituted benzophenone moiety.

9. The photohardenable composition of claim 2 wherein the at least one of Ra, Rb, and $R^1$-$R^8$ comprising a substituted or unsubstituted diaryl ketone moiety represented by general formula (A) comprises a substituted or unsubstituted benzophenone moiety.

10. The photohardenable composition of claim 3 wherein the at least one of Ra, Rb, and $R^1$-$R^8$ comprising a substituted or unsubstituted diaryl ketone moiety represented by general formula (A) comprises a substituted or unsubstituted benzophenone moiety.

11. A method of printing an object comprising:
(a) providing a volume including a photohardenable composition comprising a photohardenable component and a photoswitchable photoinitiator, wherein the photoswitchable photoinitiator is activatable by exposure to light having a first wavelength and light having a second wavelength to induce a crosslinking or polymerization reaction in the photohardenable component, wherein the first and second wavelengths are different, and wherein the photoswitchable photoinitiator comprises a naphthopyran molecule including one or more substituents wherein at least one substituent comprises a substituted or unsubstituted diaryl ketone moiety represented by general formula (A):

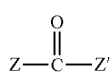

wherein Z and Z' are the same or different and are independently a substituted or unsubstituted aryl group or a substituted or unsubstituted heteroaryl group;

(b) simultaneously or sequentially irradiating one or more selected locations within the volume of the photohardenable composition with light having a first wavelength and light having a second wavelength, wherein light having the first wavelength and light having the second wavelength activate the photoswitchable photoinitiator at the one or more selected locations and at least partially harden the photohardenable composition at the one or more selected locations within the volume to at least partially form the object, wherein the object at least partially formed in the photohardenable composition remains at a fixed position or is minimally displayed in the unhardened photohardenable composition during formation; and (c) optionally repeating step b, irradiating the photohardenable composition at one or more of the same or different locations in the volume until the object is partially or fully formed.

12. A photoswitchable photoinitiator comprising a naphthopyran molecule including one or more substituents wherein at least one substituent comprises a substituted or unsubstituted diaryl ketone moiety represented by general formula (A):

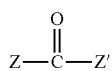

wherein Z and Z' are the same or different and are independently a substituted or unsubstituted aryl group or a substituted or unsubstituted heteroaryl group.

13. The photoswitchable photoinitiator of claim 12 wherein the at least one substituent comprising a substituted or unsubstituted diaryl ketone moiety represented by general formula (A) comprises a substituted or unsubstituted benzophenone moiety.

14. The photoswitchable photoinitiator of claim 12 wherein the naphthopyran molecule is represented by general formula (I):

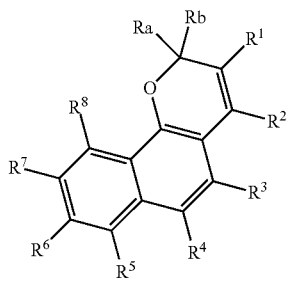

wherein Ra, Rb, and $R^1$-$R^8$ are the same or different and represent hydrogen, deuterium, a substituted or unsubstituted alkyl group, a substituted or unsubstituted alkenyl group, a substituted or unsubstituted cycloalkenyl group, a substituted or unsubstituted cycloalkyl group, a substituted or unsubstituted aryl group, a substituted or unsubstituted aralkyl group, a substituted or unsubstituted alkylaryl group, a substituted or unsubstituted heteroaryl group, a substituted or unsubstituted aryloxy group, a substituted or unsubstituted alkoxy group, a substituted or unsubstituted ester group, a substituted or unsubstituted carbonate group, a substituted or unsubstituted ketone group, a substituted or unsubstituted aldehyde group, a substituted or unsubstituted imine group, a substituted or unsubstituted carboxyl group, a substituted or unsubstituted amido group, a substituted or unsubstituted urethane group, a substituted or unsubstituted urea group, a substituted or unsubstituted tetrazine group, a substituted or unsubstituted amino group, iodo, bromo, chloro, fluoro, a cyano group, a nitro group, a hydroxyl group, a thiol, an alkyl thioether, an aryl thioether, or a substituted or unsubstituted alcohol group; wherein at least one of Ra, Rb, and $R^1$-$R^8$ comprises a substituted or unsubstituted diaryl ketone moiety represented by general formula (A):

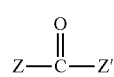

wherein Z and Z' are the same or different and are independently a substituted or unsubstituted aryl group or a substituted or unsubstituted heteroaryl group.

15. The photoswitchable photoinitiator of claim 14 wherein the at least one of Ra, Rb, and $R^1$-$R^8$ comprising a substituted or unsubstituted diaryl ketone moiety represented by general formula (A) comprises a substituted or unsubstituted benzophenone moiety.

16. The photoswitchable photoinitiator of claim 12 wherein the naphthopyran molecule is represented by general formula (II):

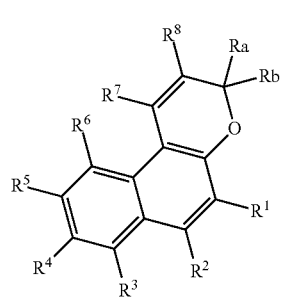

wherein Ra, Rb, and $R^1$-$R^8$ are the same or different and represent hydrogen, deuterium, a substituted or unsubstituted alkyl group, a substituted or unsubstituted alkenyl group, a substituted or unsubstituted cycloalkenyl group, a substituted or unsubstituted cycloalkyl group, a substituted or unsubstituted aryl group, a substituted or unsubstituted aralkyl group, a substituted or unsubstituted alkylaryl group, a substituted or unsubstituted heteroaryl group, a substituted or unsubstituted aryloxy group, a substituted or unsubstituted alkoxy group, a substituted or unsubstituted ester group, a substituted or unsubstituted carbonate group, a substituted or unsubstituted ketone group, a substituted or unsubstituted aldehyde group, a substituted or unsubstituted imine group, a substituted or unsubstituted carboxyl group, a substituted or unsubstituted amido group, a substituted or unsubstituted urethane group, a substituted or unsubstituted urea group, a substituted or unsubstituted tetrazine group, a substituted or unsubstituted amino group, iodo, bromo, chloro, fluoro, a cyano group, a nitro group, a hydroxyl group, a thiol, an alkyl thioether, an aryl thioether, or a substituted or unsubstituted alcohol group; wherein at least one of Ra, Rb, and $R^1$-$R^8$ comprises a substituted or unsubstituted diaryl ketone moiety represented by general formula (A):

(A)

wherein Z and Z' are the same or different and are independently a substituted or unsubstituted aryl group or a substituted or unsubstituted heteroaryl group.

17. The photoswitchable photoinitiator of claim 16 wherein the at least one of Ra, Rb, and $R^1$-$R^8$ comprising a substituted or unsubstituted diaryl ketone moiety represented by general formula (A) comprises a substituted or unsubstituted benzophenone moiety.

18. The photoswitchable photoinitiator of claim 14 wherein Ra and Rb are the same or different and represent a substituted or unsubstituted aryl C6-C20 group or a substituted or unsubstituted C4-C19 heteroaryl group.

19. The photoswitchable photoinitiator of claim 12 wherein the photoswitchable photoinitiator is represented by general formula (IV):

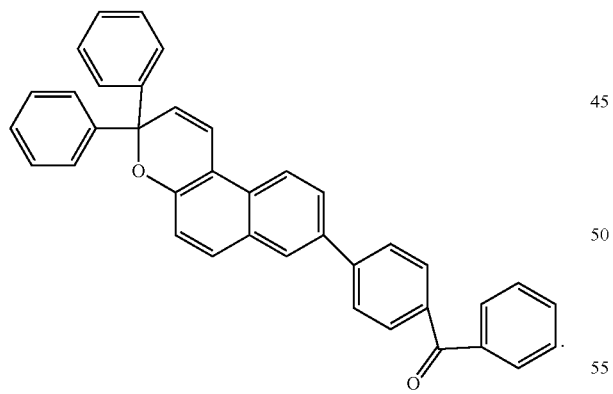

(IV)

20. The photoswitchable photoinitiator of claim 16 wherein Ra and Rb are the same or different and represent a substituted or unsubstituted aryl C6-C20 group or a substituted or unsubstituted C4-C19 heteroaryl group.

21. The method of claim 11 wherein the at least one substituent comprising a substituted or unsubstituted diaryl ketone moiety represented by general formula (A) comprises a substituted or unsubstituted benzophenone moiety.

22. The method of claim 11 wherein the naphthopyran molecule is represented by general formula (I):

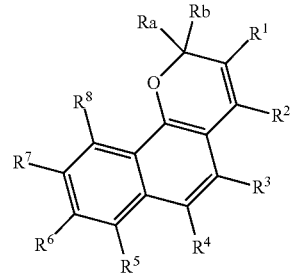

(I)

wherein Ra, Rb, and $R^1$-$R^8$ are the same or different and represent hydrogen, deuterium, a substituted or unsubstituted alkyl group, a substituted or unsubstituted alkenyl group, a substituted or unsubstituted cycloalkenyl group, a substituted or unsubstituted cycloalkyl group, a substituted or unsubstituted aryl group, a substituted or unsubstituted aralkyl group, a substituted or unsubstituted alkylaryl group, a substituted or unsubstituted heteroaryl group, a substituted or unsubstituted aryloxy group, a substituted or unsubstituted alkoxy group, a substituted or unsubstituted ester group, a substituted or unsubstituted carbonate group, a substituted or unsubstituted ketone group, a substituted or unsubstituted aldehyde group, a substituted or unsubstituted imine group, a substituted or unsubstituted carboxyl group, a substituted or unsubstituted amido group, a substituted or unsubstituted urethane group, a substituted or unsubstituted urea group, a substituted or unsubstituted tetrazine group, a substituted or unsubstituted amino group, iodo, bromo, chloro, fluoro, a cyano group, a nitro group, a hydroxyl group, a thiol, an alkyl thioether, an aryl thioether, or a substituted or unsubstituted alcohol group; and wherein at least one of Ra, Rb, and $R^1$-$R^8$ comprises a substituted or unsubstituted diaryl ketone moiety represented by general formula (A):

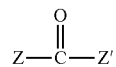

(A)

wherein Z and Z' are the same or different and are independently a substituted or unsubstituted aryl group or a substituted or unsubstituted heteroaryl group.

23. The method of claim 11 wherein the naphthopyran molecule is represented by general formula (II):

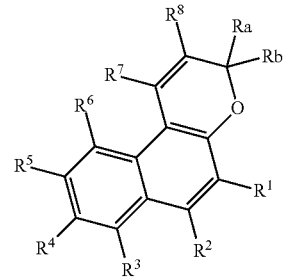

(II)

wherein Ra, Rb, and $R^1$-$R^8$ are the same or different and represent hydrogen, deuterium, a substituted or unsubstituted alkyl group, a substituted or unsubstituted alkenyl group, a substituted or unsubstituted cycloalkenyl group, a substituted or unsubstituted cycloalkyl group, a substituted or unsubstituted aryl group, a substituted or unsubstituted aralkyl group, a substituted or unsubstituted alkylaryl group, a substituted or unsubstituted heteroaryl group, a substituted or unsubstituted aryloxy group, a substituted or unsubstituted alkoxy group, a substituted or unsubstituted ester group, a substituted or unsubstituted carbonate group, a substituted or unsubstituted ketone group, a substituted or unsubstituted aldehyde group, a substituted or unsubstituted imine group, a substituted or unsubstituted carboxyl group, a substituted or unsubstituted amido group, a substituted or unsubstituted urethane group, a substituted or unsubstituted urea group, a substituted or unsubstituted tetrazine group, a substituted or unsubstituted amino group, iodo, bromo, chloro, fluoro, a cyano group, a nitro group, a hydroxyl group, a thiol, an alkyl thioether, an aryl thioether, or a substituted or unsubstituted alcohol group; and wherein at least one of Ra, Rb, and $R^1$-$R^8$ comprises a substituted or unsubstituted diaryl ketone moiety represented by general formula (A):

(A)

wherein Z and Z' are the same or different and are independently a substituted or unsubstituted aryl group or a substituted or unsubstituted heteroaryl group.

* * * * *